United States Patent
Danisch

(10) Patent No.: US 10,221,675 B2
(45) Date of Patent: Mar. 5, 2019

(54) CYCLICAL SENSOR ARRAY

(71) Applicant: 059312 N.B. INC., Fredericton (CA)

(72) Inventor: Lee Allen Danisch, New Market (CA)

(73) Assignee: 059312 N.B. INC., Fredericton (CA)

( * ) Notice: Subject to any disclaimer, the term of this patent is extended or adjusted under 35 U.S.C. 154(b) by 637 days.

(21) Appl. No.: 14/888,628

(22) PCT Filed: May 1, 2014

(86) PCT No.: PCT/CA2014/050414
§ 371 (c)(1),
(2) Date: Nov. 2, 2015

(87) PCT Pub. No.: WO2014/176698
PCT Pub. Date: Nov. 6, 2014

(65) Prior Publication Data
US 2016/0108719 A1    Apr. 21, 2016

(30) Foreign Application Priority Data
May 2, 2013 (CA) ..................... 2815199

(51) Int. Cl.
*E21B 47/022* (2012.01)
*E21B 7/00* (2006.01)
(Continued)

(52) U.S. Cl.
CPC .............. *E21B 47/022* (2013.01); *E02F 5/02* (2013.01); *E21B 7/00* (2013.01); *G01C 9/00* (2013.01);
(Continued)

(58) Field of Classification Search
CPC .. E21B 47/022; E21B 7/00; E02F 5/02; E02F 5/101; E02F 5/12; G01C 15/00; G01C 9/00

See application file for complete search history.

(56) References Cited

U.S. PATENT DOCUMENTS

| 4,399,692 A | 8/1983 | Hulsing, II et al. |
| 4,542,647 A | 9/1985 | Molnar |

(Continued)

FOREIGN PATENT DOCUMENTS

| GB | 2023293 A | 12/1979 |
| JP | H04-299033 A | 10/1992 |

(Continued)

OTHER PUBLICATIONS

Japanese Office Action dated Mar. 13, 2018, in connection with corresponding JP Application No. 2016-510911 (11 pgs., including English translation).

(Continued)

*Primary Examiner* — Daniel P Stephenson
(74) *Attorney, Agent, or Firm* — Maier & Maier, PLLC

(57) ABSTRACT

A non-straight sensor array within a gravity field, within a surface and cyclically surrounding a medial axis. The sensor array includes rigid bodies holding gravimetric tilt sensors, the rigid bodies being connected by flexible joints. The flexibility of the joints is constrained to two degrees of freedom. The shape of the path, the surface, and the medial axis are measured in at least two dimensions, using the tilt sensor data and the geometrical constraints of the joints. The cyclical geometry permits simultaneous measurement of lateral and axial deformations in deployments varying from axially vertical to axially horizontal, as well as improved fit of the array to surrounding surfaces. The field of use includes geotechnical measurements of soil and civil structures.

17 Claims, 21 Drawing Sheets

(51) Int. Cl.
*E02F 5/02* (2006.01)
*G01C 9/00* (2006.01)
*G01C 15/00* (2006.01)
*E02F 5/12* (2006.01)
*E02F 5/10* (2006.01)

(52) U.S. Cl.
CPC .............. *G01C 15/00* (2013.01); *E02F 5/101* (2013.01); *E02F 5/12* (2013.01)

(56) References Cited

U.S. PATENT DOCUMENTS

| | | | | |
|---|---|---|---|---|
| 6,127,672 | A * | 10/2000 | Danisch | G01B 11/18 250/227.14 |
| 6,563,107 | B2 | 5/2003 | Danisch | |
| 7,296,363 | B2 | 11/2007 | Danisch | |
| 7,584,808 | B2 * | 9/2009 | Dolgin | E21B 17/1057 175/45 |
| 9,777,568 | B2 * | 10/2017 | Danisch | E02D 31/00 |
| 2009/0281686 | A1 * | 11/2009 | Smith | B63C 1/06 701/21 |
| 2010/0096186 | A1 * | 4/2010 | Ekseth | E21B 7/067 175/45 |
| 2016/0108719 | A1 * | 4/2016 | Danisch | G01C 9/00 175/57 |
| 2016/0123134 | A1 * | 5/2016 | Viens | E21B 7/04 175/45 |

FOREIGN PATENT DOCUMENTS

| | | |
|---|---|---|
| JP | 2004-517331 A | 6/2004 |
| JP | 2006-343114 A | 12/2006 |
| JP | 2010-32475 A | 2/2010 |
| WO | 98/41815 A1 | 9/1998 |
| WO | 2011/137348 A1 | 11/2011 |

OTHER PUBLICATIONS

International Search Report dated Jul. 16, 2014 from corresponding International Patent Application No. PCT/CA2014/050414; 5 pgs.
Notification of Transmittal of International Preliminary Report on Patentability from corresponding International Application No. PCT/CA2014/050414; 28 pgs.
Extended European Search Report (EESR) dated Apr. 18, 2017, including a Supplementary European Search Report and the European Search Opinion, in connection with corresponding EP Application No. 14791142.4 (13 pgs.).
Partial Supplementary European Search Report dated Dec. 23, 2016, in connection with corresponding EP Application No. 14791142.4 (6 pgs.).
Chinese Office Action dated May 2, 2017, in connection with corresponding CN Application No. 201480024296.9 (14 pgs., including English translation).
Unknown author, "Measurand ShapeAccelArray (SAA)", Jul. 3, 2010, XP055329126, retrieved from the internet: URL: http://www.geotrade.com/him_upload/image/Standard/geotechnics/SAAF/original/SAA_specificatons.pdf., (23 pgs.).

* cited by examiner

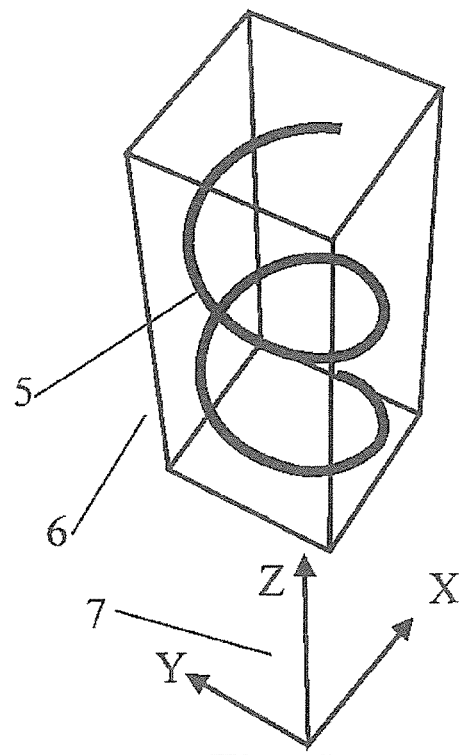
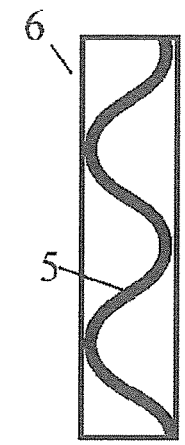
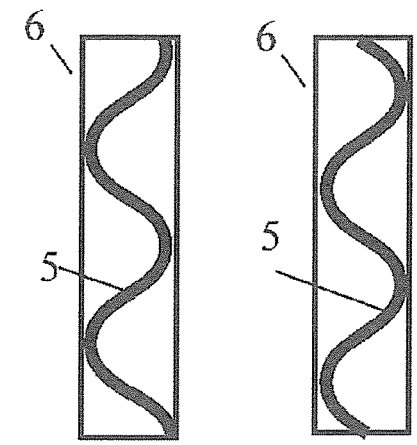
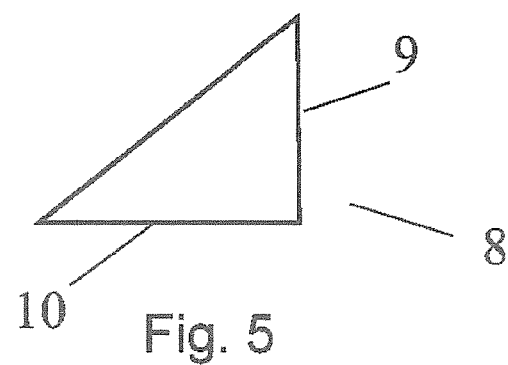
Fig. 2   Fig. 3   Fig. 4
Fig. 5

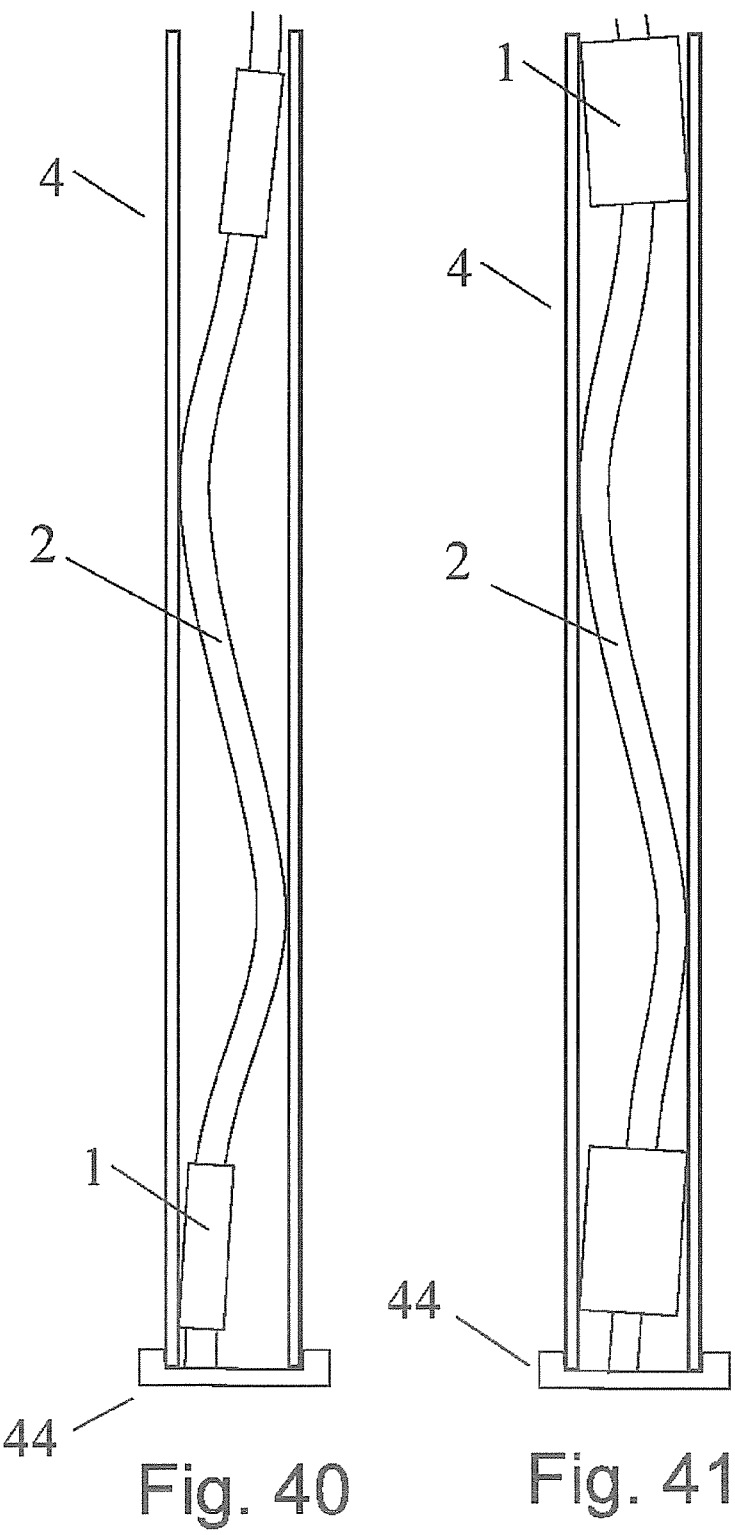

CYCLICAL SENSOR ARRAY

FIELD OF THE INVENTION

This invention relates to sensor technology. In particular, the invention relates to a tool or device for measuring the shapes of soil and civil structures, and the changes in the shapes over time. The invention represents improvements in the inventions described in U.S. Pat. No. 6,127,672, issued Oct. 3, 2000 to Lee Danisch (Danisch '672); U.S. Pat. No. 6,563,107 issued May 13, 2003 to Lee Danisch et al. (Danisch '107), and U.S. Pat. No. 7,296,363, issued Nov. 20, 2007 to Lee Danisch et al. (Danisch '363"), and improvements over prior-art inclinometer technology.

A preferred application, amongst others, is in the field of geotechnical sensing for monitoring movements of landslides and construction sites.

BACKGROUND OF THE INVENTION

In the field of geotechnical engineering, instruments called inclinometers are available for measuring tilt in vertical or horizontal boreholes, for the purpose of calculating a path of the borehole based on one- or two-degree-of-freedom tilts, the length of the inclinometer, and the known orientation of the inclinometer about its long axis, which is controlled by straight grooves in the inclinometer casing lining the borehole. The inclinometer is either moved along the casing and stopped at spatial intervals for reading tilt (traversing inclinometer), or multiple inclinometers rest in the casing and are read at intervals in time (in-place inclinometers). Traversing inclinometers and in-place inclinometers will be referred to here as "conventional inclinometers".

An improvement over in-place inclinometers has been patented (Danisch '363). It is a calibrated measurement instrument comprised of rigid tubes (rigid bodies) fitted with tilt sensors, the tubes separated by built-in bendable joints resistant to twist, that can be used directly without grooved casing to measure path shape and vibration along the path. Danisch '363 will be referred to hereinafter as "SAA", or ShapeAccelArray. The SAA does not require grooves in the casing to perform azimuthal alignment of each rigid body about the long axis of the SAA. The twist-resistant joints maintain azimuthal alignment. Azimuth of each rigid body, which is not physically controlled during manufacture, is calibrated at the end of the manufacturing process, by using the X and Y tilt sensors in each body to measure the "roll" angle of each body when the SAA is generally horizontal. During manufacture, all offsets and gains of the sensors are calibrated so that accurate tilt measurements can be made over a wide temperature range, and over all angles.

Both conventional inclinometers and SAA rely on gravimetric measurement of tilt. Measurement of tilt amounts to determining the portion of the gravity vector acting upon a mass supported by springs in a reference frame, as the axis of the reference frame is tilted. In some cases, conventional inclinometers use liquid-filled curved tubes instead of springs and masses. In other cases, servo-controlled springs and masses are used.

Another prior-art measurement system similar to inclinometers is the "Bassett Convergence System". It is an array of arms (metal rods) that form an arc around the circumference of a tunnel, all in the plane of a cross section. Angles between the arms are measured with levered tilt sensors, the levers providing amplification of the movement and conformability to a changing shape of the cross section. The angle measurements are for one degree of freedom. Convergence is the movement of the tunnel wall toward or away from the center of the tunnel. A similar measurement is made by SAA arranged within a tube formed into a circular arc and attached to the inner wall of the tunnel, also in the plane of the cross section. Angular deformation of the arc is measured in one degree of freedom and is used to measure planar convergence as in the Bassett Convergence System.

Deficiencies of both conventional inclinometers and SAA include:

Inability of the system to compress or expand axially along the path, or to measure axial deformation of the media near the instrument, such as the compression of subsiding soil, or the expansion of swelling soil. This is because the paths are nominally straight. For instance, soil compressing around an inclinometer casing will not change the length of the casing or the tilts of the instruments inside. In some cases, telescoping casing is used to enable shortening or lengthening of the casing as soil compression varies, but the tilts remain unchanged; that is the intention. Other instrumentation is needed to measure the compression of the casing or soil. Even the SAA, which can be installed in very flexible casing but is installed straight, will not be affected by soil compressing or extending around the casing, except in cases of very large lateral deformation (e.g. from a landslide), which can result in some changes in the vertical component of displacement from end-to-end of the path due to a large lateral shear at one axial location. But even when lateral deformation occurs, the axial deformation, if any, cannot be distinguished from the lateral deformation. Only if the lateral deformation were known to occur first, and then be known to be followed by pure axial compression or extension, would one be able to measure the total axial component with any confidence. However, such sequences of purely lateral and axial movements are not known to occur, and are hypothetical. Even if they did occur, no detail of axial deformation at different elevations along the path would be provided. The Bassett Convergence System allows for some expansion along its curved arc, but does not measure this expansion, nor do tunnels generally change their circumference; they generally change shape while maintaining a constant arc length.

Inability to measure lateral deformation of the path when the path is near-horizontal. This is because any rotation of a gravimetric instrument about the gravity vector does not change the influence of gravity on the instrument.

Inability to measure the shape of a surface with one instrument. Most prior-art inclinometer and SAA instruments measure deformation of an initially straight line. Multiple straight-line instruments would be required to define the shape of a surface.

Inability to measure detail of axial deformation at different locations along or near the path. This is a consequence of not measuring any axial deformation at all, or in the hypothetical case cited above, of SAA undergoing pure lateral deformation first, followed by pure axial deformation, wherein there would be no detail of axial deformation along the path; solely one axial deformation number for one lateral deformation feature (such as a shear at one axial location).

Inability to measure other than deformation within the vertical plane of an arcuate path of a convergence measurement such as an SAA in an arc, or the arc of a Bassett Convergence System. Convergence measurements are limited to movements toward or away from the center of a tunnel, performed by tilt or angle sensors arranged in an arc or circle. No measurement is made of deformation in directions out of the plane of the arc or circle.

Inability to secure the measurement instruments within a casing or tube. Instruments in boreholes and other narrow passages must be able to pass freely into the passage, yet establish secure contact with the walls of the passage when measurements are made. For SAA, this is done using joints that swell when under axial compression, but the range of swelling is only sufficient to partly stabilize the contact. For inclinometers, spring-loaded wheels are used to engage in grooves in casing, but these can become worn and are expensive to manufacture and difficult to handle. Other fastening methods are available, such as inflatable bladders, but these are expensive and complicated.

Prior-art descriptions of conventional inclinometers and SAA are restricted to generally initially-straight paths, and do not anticipate or allow for calculations of extension and compression (either total, or in detail along the path) and lateral deformation resulting from geometries that result in changes in the straight-line separation between the ends of a purposely non-straight path. Nor does the prior art of SAA and inclinometers contemplate installation along a generally horizontal medial axis wherein is provided measurement of lateral deformation of the medial axis within a horizontal plane. By medial axis, it is meant a line or curve aligned axially with the longest dimension of a surface containing the path of an inclinometer or SAA. It follows the "center" of the path. For a straight path, it is the path. For a sinuated path, the medial axis falls between roughly equal amounts of sinuations. The medial axis will be defined more carefully later in this description.

Prior-art SAA and inclinometer descriptions are limited to generally vertical, slanted, or horizontal straight-path shapes, wherein extension or compression of the path is not possible, and measurement of lateral deformation of horizontal paths in the horizontal plane is not possible. The exception is convergence measurements performed by circles or arcs of one degree of freedom (1DOF) sensors in a vertical plane. However, these arcuate measurements are limited to movements within the plane and are either difficult to physically fit to the surface (Bassett Convergence System), or are an imperfect fit (SAA in an arcuate or circular shape within a plastic tube). The imperfect fit of the SAA will be elucidated later in this description.

In the prior art, SAA is installed by placing it in a straight tube and causing the joints to swell under axial compression, to touch the inside surface of the tube. This helps to stabilize the SAA within the tube, but is not sufficient to prevent all movement. The joints must be short enough to reduce twist, yet the shortness limits the degree to which they can swell under axial load. The swelling must diminish during insertion into or extraction from a tube, so the joints must be flexible enough to do this while still having enough stiffness to hold the array steady within the tube when swollen. The result is a compromise resulting in imperfectly-secured arrays.

In the field of geotechnical engineering there is a need to measure deformation of soils that exhibit deformation due to extension or compression, accompanied in some cases also by lateral deformation due to shearing of a layer or layers of soil, such as in an unstable slope or landslide. Compression of soils is usually associated with presence of compressible media, such as peat, within the soil, or presence of voids. Extension can result from presence of swelling clays or swelling chemical compounds present in the soil, or from injection of grout intended to stabilize weak soils. For simplicity of wording, the term "extension" (or "compression"), unless otherwise qualified, will be used to cover both cases, since extension or compression can be positive or negative (we can think of negative extension being a compression). Extension can be measured using magnets fixed to the soil next to a borehole, and a magnetic sensor moved along a borehole in the soil, but this measurement does not provide data on lateral deformation, and requires manual movement of the sensor.

In the field of geotechnical engineering there is a need to measure lateral deformation at the toe of a slope, where shearing action from above can lead to spreading of soil laterally near the bottom ("toe") of the slope. If an SAA or conventional inclinometer is installed horizontally at the toe of a slope, it will provide measurement of deformation within a vertical plane but not a horizontal plane. This is because rotation of gravimetric devices within a horizontal plane is not sensed due to symmetry of the gravity field about the vertical dimension. Multiple vertical SAAs or conventional inclinometers can be installed to provide data on deformation within horizontal planes, but this is expensive.

In the field of tunnel and wall measurements, an installation of conventional inclinometers or SAA arrayed in a generally horizontal path along a tunnel or wall will not measure lateral deformation, because rotation of gravimetric devices within a horizontal plane is not sensed due to symmetry of the gravity field about the vertical dimension. For instance, if the wall bulges out, or if the tunnel wall curves within the horizontal plane due to excavation or grout injection nearby, the component of the bulge or curve within the horizontal plane will not be measured by the above horizontally-placed instruments. Multiple vertical conventional inclinometers or SAA may be installed, each extending from non-moving soil well below the tunnel or wall, but this solution is expensive and difficult to install.

Also in the field of tunnel measurements, it is known to place conventional inclinometers or SAA in horizontal paths along the roof, floor, or wall of a tunnel, providing measurement of deformation within vertical planes but never horizontal planes. It is also known to place such instruments in a generally circular path around the circumference, or part of the circumference, of a vertical cross section of the tunnel, for measuring convergence, which is comprised of movements of the tunnel walls toward or away from the center of the tunnel at any angle in the vertical plane. But there exists no device and method for measuring three-dimensional (3D) shape of the tunnel using a single gravity-based instrument having a single path, where "3D" implies vertical subsidence, horizontal curvature, and convergence. An analogy would be measuring all the movements of a snake including horizontal and vertical sinuation, and shape of its cross sections.

More specifically, in the field of convergence measurements introduced above, measurements in the prior art are always within the plane of the arc of the instrument. There exists a need for the single instrument to provide data not only within the plane, but extending out from the plane and including 3D aspects of the tunnel associated with movements axially along the tunnel.

In the field of geotechnical engineering there is a need to measure deformation within a vertical plane, using an installation of conventional inclinometers or SAA arrayed in a generally horizontal path, wherein extension is allowed, curving of part of the instrument up or down within the plane (e.g. heaving or subsidence) is allowed, and lateral movement is allowed, and all parameters are measured. For example, it is desirable to install inclinometers or SAA next to railway tracks to detect changes in the ballast supporting the sleepers and tracks, or along the shoulder of a road to detect erosion of the shoulder. A limitation of horizontal straight-line instruments is that if ballast or shoulder material is removed from below the path, such as by erosion or subsidence, the path of the instrument can remain unbent because the instrument is inextensible and held in tension at both edges of an area of subsidence. Thus, subsidence can occur and not be measured, or be measured with great attenuation of the depth.

In the field of geotechnical engineering there is a need to secure inclinometers or SAA so that they do not move within a casing, causing errors in tilt measurement or vibration measurement.

Conventional inclinometers are typically installed in grooved casing, with wheels engaged in the grooves to provide azimuth control and consistent registration of the inclinometer body with the walls of the casing. SAA is typically installed in un-grooved casing. SAAs have torsion-resisting joints and have been calibrated to provide a consistent azimuth along the SAA. The diameter of the casing and the length and diameter of the rigid bodies of inclinometers or SAAs set an upper limit on the amount the casing can bend without disturbing the measurements. The disturbance can result from bending of the rigid bodies, or inability of the instruments to be moved along the casing during measurement, installation, or withdrawal. This is a serious problem when large deformations are present, or for installations in rock, where bends of the casing can be very sharp and abrupt. It is generally desired to install larger-diameter casing and use shorter rigid bodies in such situations, but this leads to greater expense and loose-fitting instruments. A means of conforming a small-diameter instrument to the inside of a larger-diameter cylinder without added fixturing and without swelling joints is not described in the prior art.

Prior-art inventions have included non-straight sensor paths, but have relied on bend and twist sensors ("curvature" sensors). For instance Danisch '107 (Shape Rope") describes "A measuring device for providing data corresponding to a geometric configuration in space, in the form of a flexible, compliant, measurement member capable of bending in at least one degree of freedom and extending along a medial axis or plane. The member has spaced flexure sensors distributed at known locations on the member and separated by known sensor spacing intervals to provide flexure signals indicating the local state of flexure present at the locations. The member comprises a multiplicity of formed, i.e. shaped, fibers, these fibers including sensing fibers having sensing portions which provide the flexure sensors, the sensing portions of different fibers being located at differing distances along the member so as to be located at the sensor spacing intervals, the formed fibers being in mutually supporting relationship, as by continuous or repeated contact with each other. Such fibers may constitute most or all of the member".

Devices using flexural sensors in concatenated arrays suffer from a serious deficiency: when there is an error in one of the sensors, the orientation of all of the array past that point in the order of calculation will share the angular offset of the error, which will cause the entire data set representing a measured path to swing well away from the path, by the angle of the error. This can result in a huge displacement at the end of the path.

Further, in Danisch '107 the fibers are pre-formed and in a mutually-supporting relationship that is not suited to being compressed axially and thereby swelling laterally to conform to an enclosing surface. In fact, Danisch '107 proposes using separate extension sensors for an elastomeric form of Shape Rope that can be stretched. Danisch '107 does not teach a straight array that may be rolled up onto a reel that can be deployed straight, and then formed into a helix by inserting it into a borehole and applying axial compressive force. Instead, Danisch '107 requires that a multiplicity of fibers be pre-formed into mutually-supporting helices of fixed dimensions, the configuration not being amenable to the use of gravitational sensors measuring tilt. There is no teaching of rigid bodies separated by flexible joints, the rigid bodies providing a means of sampling tilt uniformly along a region, referenced to gravity, rather than sampling bend along a flexible member easily distorted by contact with objects. There is no teaching of flexible joints providing torsional stiffness but allowing bend, between rigid bodies. There is no teaching of referencing all the sensors to gravity, so that orientation errors cannot propagate up a calculation chain. There is no teaching of sensors in rigid bodies so that orientation may be read directly by gravimetric sensors, rather than inferred from measurements of bend and twist. There is teaching of forming the fiber optic or capacitive-fiber array, itself already in helical rope form, into helical forms, but that is no more distinguished from prior art than forming a spring or building a spiral staircase. The teaching is a description of forms that can be taken on by a flexible member, as a result of its internal cyclical structure.

The present invention incorporates helical, sinuated, and zigzag forms (cyclical forms) into a means of measuring specific new parameters, while improving the fit of the sensor array to that which is measured; but that is not all. A primary inventive step is utilizing MEMS (micro-mechanical electro-mechanical systems) accelerometers to make the measurements, even though it would seem impossible to do so, because of their limitations of orientation range, due to the directionality of gravity.

Bend and twist sensors can easily measure flexing in 3D of a rope-like structure no matter what its overall orientation might be; whereas static accelerometer measurements ("tilt" measurements or "gravimetric" measurements) could previously only be used to make 3D measurements if the overall orientation was within approximately +/−60 degrees of vertical. This is because neither X, Y, nor Z sensors respond at all to rotations about the gravity vector, and X an Y sensors (those with a maximal response to tilt when an SAA is vertical) drop in response as the cosine of the angle from vertical. Before the present invention, the only way to accomplish 3D measurement of a vertical plane was to install multiple vertical SAAs along the plane, each one extending into unmoving soil for a reference, so that each provided 3D data from a fixed reference. There was no way to extend an SAA or inclinometer along a horizontal ditch and capture movements within the horizontal plane. It was also thought impossible to couple soil subsidence movements to a thin, straight, sensor array. Once helical forms of SAA were considered, it still seemed impossible to couple that form to soil subsidence movements, until the relationship between Poisson's ratio and the helix strain ratio was recognized (this relationship is explained in detail later in this description). Advances in miniaturization of sensors, and construction methods for joints have now made it possible to contemplate the low pitch angles necessary to match the two ratios.

Although 3D measurements can be made with bend and twist sensors over a full spherical range of orientations, the accuracy of bend and twist sensors excludes them from use for monitoring geotechnical parameters. Geotechnical measurements must be accurate to one or two millimeters over array lengths of tens of meters, for decades. Practical, low-cost bend and twist sensors, such as the fiber optic curvature sensors used in the Danisch '107 and '672 prior art, are not capable of such accuracy. They are capable of approximately 1 cm per meter, per day, which is orders of magnitude too poor for geotechnical measurements.

The adaptation of cyclical forms for use with gravimetric sensors measuring at a point rather than optical or capacitive sensors integrating curvature over a path length requires the introduction of rigid bodies to contain the "point" sensors, the rigid bodies being long enough compared to the joint lengths to properly represent the tilts of the array. Practical sensing means also require design of the joints so they can be as long as possible, without requiring expensive mechanisms. The concept of long joints with monotonic and constant bend and/or twist enables much longer joints, if used so the constancy can be maintained.

Improved 2D data can also be obtained with the present invention. Straight arrays laid horizontally in a ditch can miss subsidence, such as from a washout of all the material below the array, because they are inextensible and will simply traverse the washout without appreciable sagging. A sinuated array will allow extension and make the measurement, which is very useful even if only a 2D measurement is made with just the Z sensors. Improved convergence measurements can be made by sinuating an array around its generally circular path around the circumference of a tunnel, in situations where only 2D convergence measurements within the plane of the circle are required. In this convergence case, the improvement comes from the array being better-secured within a sinuated casing, and the addition of extensibility to the circular path. Measurement of cant and twist of railway tracks is another 2D (arguably with 3D aspects) example of the improvements conferred by cyclical deployment, as are other sinuations of arrays within a horizontal plane for measuring subsidence profiles of a horizontal surface.

Similar remarks as those for Danisch '107 apply to Danisch '672 ("Shape Tape"), which describes "A position, orientation, shape and motion measuring tool is provided in the form of a flexible substrate with bend and twist sensors distributed along its surface at known intervals. A ribbon-type substrate is preferred. The geometric configuration of the substrate is calculated from inter-referencing the locations and orientations of the sensors based upon the detected bend and twist values. Suitable applications include motion capture for humans for use in animation, six degree of freedom input to a computer, profile measurement and location tracking within a large, singularity-free working space".

Danisch '672 does not teach use of gravimetric sensors in rigid bodies for measuring orientations of the rigid bodies directly. Instead, it teaches measuring bend and twist along a ribbon substrate. If any bend or twist measurement is incorrect along the calculation path, then all subsequent orientations of the path, as represented by the data, will be incorrect. Danisch '672, like Danisch '107, does not teach a straight array that may be rolled up onto a reel that can be deployed straight, and then formed into a helix by inserting it into a borehole and applying axial compressive force.

Neither Danisch '672 nor '107 teaches deploying a sensor array into a surface with the form of the array and the orientations of the sensors in rigid bodies designed to exploit the use of gravitational sensors to obtain 3D data from the surface. Nor do Danisch '672 or '107 teach calculating an extensible/compressible medial axis from the forms of an array, in order to emulate the shape of an extensible/compressible virtual array in a path following the medial axis of each array. Nor do they teach tracking of vertex information in detail along a medial axis, so that compression and extension may be known in detail along the axis. Nor do '672 nor '107 teach the securing of an array within a surface by means of lateral expansion caused by axial compression of the form of the array.

One of the reasons that prior-art gravimetric arrays like Danisch '363 (SAA), and traditional in-place inclinometers have not been designed as extensible helixes or sinuated forms, and have been excluded from measuring lateral deformation from near-horizontal deployments, has been the novelty of Danisch '363. Prior to '363, it had not been considered possible to work over a wide range of angles even though relying on gravimetric sensors. Because inclinometers must be installed in grooved casing with very limited ability to bend, shapes other than straight or slightly curved could not be contemplated. Because thinking in the geotechnical field was limited to straight-path geometries, it was considered impossible to measure lateral deformation from a horizontal path, because the measured gravity field would not change for such a rotation. Danisch '363 was similarly limited in scope, disclosing only installations in straight paths that are near-horizontal or near-vertical. Near-horizontal straight paths would only yield 2D measurements. It was not until '363 was deployed in the field and had been able, due to its flexibility and wide angular range of its sensors, to measure deformations much larger than those possible with traditional inclinometers, that it was realized that it could be installed in and optimized for purposely cyclical formats that would enable new, previously impossible measurements. The present invention describes how to realize multi-dimensional measurements using new forms of SAA, even measurements that involve lateral deformation of a generally horizontal path within a vertical gravity field. It also includes descriptions of simultaneous measurement of lateral deformation and axial compression of a generally vertical path, using an inextensible array of rigid bodies fitted only with gravitational sensors.

Other improvements of the present invention over Danisch '363 (SAA) include better securing of the array in a casing, due to exploitation of helixes and sinuation. Prior-art Danisch '363 uses joints that expand under axial compression, but that leaves approximately +1-1 mm of possible movement after installation. A helical fit permits reducing this range of possible variation to essentially zero mm. A similarly tight fit can be achieved in convergence installations, for any radius of tunnel, by sinuating the path of the SAA as it travels around the circumference of the tunnel. Other improvements include being able to use wider rigid-body separations in some installations, leading to lower cost due to a reduction in the number of sensors required.

SUMMARY OF THE INVENTION

To overcome the deficiencies of conventional inclinometers and SAA, in one aspect of the present invention there is provided a non-straight sensor array within a gravity field comprising:

rigid bodies with known dimensions, separated by joints with known dimensions,
said joints having flexibility,
the flexibility having two degrees of freedom selected from
  two of bend without mechanical twist, and
  one of bend and one of mechanical twist,
each of said degrees of freedom being monotonic and constant over the joint length,
said rigid bodies and joints defining a sensor path comprised of straight line segments intersecting in first vertices,
said straight line segments having lengths equal to the axial center-to-center distance between adjacent joints when the array is straight,
said straight line segments at tilts operationally associated with tilts of the rigid bodies,
the sensor path within a surface having at least two dimensions,
the sensor path cyclically surrounding a medial axis having at least two dimensions,
second vertices along the medial axis, operationally associated with said first vertices to represent the positions of first vertices of the sensor path along the medial axis,
the sensor path being extensible and compressible along the medial axis without changing the path length of the sensor path,
a set of said rigid bodies selected at intervals along said sensor path to represent the shape of said sensor path,
said selected set of rigid bodies having gravimetric sensors for measuring tilt of said selected rigid bodies in at least one degree of freedom per selected rigid body in the gravity field,
at least one of said selected rigid bodies having a known position and orientation in the World Coordinate System,
said array adapted for measuring the at least two-dimensional shape of the said surface, the at least two-dimensional shape of the medial axis, and the positions of the second vertices along the medial axis in the World Coordinate System from the orientation of each selected rigid body within the gravity field,
  wherein the improvements over prior art are:
  the extensibility and compressibility of the non-straight sensor array,
  the measurement of the shape of a surface with a single array,
  the measurement of horizontal lateral deformation of the medial axis when the medial axis is generally horizontal,
  improved fit and added degrees of freedom for convergence measurements
  the conformability of the array to a generally cylindrical surface,
  the lateral expansion of generally helical arrays to fit tightly to an enclosing cylindrical surface upon application of axial compression,
  improved fit of rigid bodies within a curved containing tube, and
  improved protection of helical arrays from external forces,
when using gravimetric sensors not responsive to rotations about the direction of gravity.

In one embodiment, the selected set of rigid bodies includes all the rigid bodies. In another embodiment, the selected set of rigid bodies have tilts representing the sensor path and tilts of any remaining rigid bodies are redundant to those of selected rigid bodies adjacent to said remaining rigid bodies. In another embodiment, the rigid bodies are attached to a planar flexural ribbon capable of one degree of freedom of bend and one degree of freedom of twist between adjacent rigid bodies and incapable of bend within the plane of the ribbon, wherein the ribbon forms the joints between rigid bodies.

In another embodiment, the joints of the sensor array inherently resist twist. In another embodiment, the sensor array forms a helix within a cylindrical surface in a medium capable of shear and compression, the cylindrical surface encloses the medial axis, and the medial axis represents the shape of the medium as it is deformed lateral to the medial axis by shearing and axial to the medial axis by compression.

In another embodiment, the sensor array forms a helix within a cylindrical surface and the helix is axially loaded, wherein intimate contact between the sensor array and the cylindrical surface is maintained. In another embodiment, the pitch of the helix is large, wherein intimate contact between the sensor array and the cylindrical surface is maximized.

In another embodiment, the helix of the sensor array is in a borehole or tunnel in the medium and the array is in repeated contact with the inner surface of the borehole or tunnel along the length of the array. In another embodiment, the sensor array further comprises a containing tube to contain said array, the containing tube adding stiffness in bending, the added stiffness enforcing a predictable shape within a cased or uncased borehole.

In another embodiment, the sensor array is in a generally planar surface in a medium capable of shear and compression, the plane of the surface is generally non-horizontal, and the medial axis represents the shape of the surface as it is deformed lateral to the axis by shearing and axial to the axis by compression. In another embodiment, the sensor array follows a cyclical path within said surface, said surface is generally planar, the sensor path includes portions that cross the medial axis and the portions are comprised of more than one non-horizontal rigid body, the rigid bodies providing flexibility of the shape out of its plane.

In another embodiment, a portion of the rigid bodies is non-vertical and the lateral component of the path of the medial axis is determined by the combination of three-dimensional tilt data from the non-horizontal rigid bodies, vertical-plane tilt data from the non-vertical rigid bodies, and the wavelengths of the spatial Fourier components of the shape of the path for which data are available. In another embodiment, the generally planar shape is a surface with curvature in at least one degree of freedom.

In another embodiment, at least one joint has an unknown amount of twist, and the twist is re-calculated based on the geometrical constraints of the at least two-dimensional surface, the tilts of the rigid bodies, and the joints for which twist is known. In another embodiment, the medial axis is determined from at least one spatial frequency component of said path. In another embodiment, the at least one spatial frequency component is determined by Fourier transformation.

In another embodiment, the sensor array is further in contact with an elongate containing surface at contact points generally near said first vertices, wherein the lateral dimensions of the surface are adjusted to achieve a desired spatial distribution of contact points along the surface and said second vertices along the medial axis. In another embodiment, the sensor array is in a helical shape, the surface is a cylinder, and the diameter of the cylinder is adjusted to achieve a desired spatial distribution of contact points along the medial axis.

In another embodiment, the array comprises in-place inclinometers installed in grooved inclinometer casing wherein the grooves resist twist, and the casing has preformed bends. In another embodiment, the sensor path cyclically surrounds a first medial axis in the shape of a helix and the helix cyclically surrounds a second medial axis in the shape of the center of a cylinder containing the helix. In another embodiment, the sensor path cyclically surrounds a medial axis that is an arc within a generally cylindrical surface, a band surface is defined between two arcs containing the extrema of the sensor path cycles within the generally cylindrical surface, for representing the at least two-dimensional shape of the generally cylindrical surface near the sensor path as it is deformed in at least two dimensions. In another embodiment, no more than two-dimensional deformation is measured and portrayed, and wherein the medial axis is used to represent the shape and deformation of the generally cylindrical surface.

In another embodiment, the array is in a containing tube forming the sensor path within said surface, said surface containing the medial axis, wherein the containing tube is curved within said surface to maintain intimate contact between the sensor array and the containing tube. In another embodiment, the sensors are accelerometers and the accelerometers are used to measure tilt and vibration. In another embodiment, the joints have arbitrary torsional stiffness, the sensor array forms a helix within a non-vertical cylindrical surface, and the helix is axially loaded, for the purpose of maintaining intimate contact between the sensor array and the cylindrical surface while acquiring 2D data on position and orientation of the rigid bodies.

In another aspect there is provided a method of drilling a borehole in a medium, the borehole larger in lateral dimensions than a generally straight sensor array, the borehole selected from lined or unlined, the method comprising: inserting a generally straight array into the borehole; and adding axial compression to the array to form a helix in intimate contact with the inside surface of the borehole or its lining.

In one embodiment, the generally straight sensor array is contained within a containing tube with outside diameter sufficiently small to take on a desired cyclical form within the borehole or its casing, said containing tube with stiffness in bending sufficient to ensure a desired cyclical form of said containing tube when subjected to axial force including that of gravity. In another embodiment, the axial force including that of gravity is applied to the generally straight sensor array to form it into a cyclical path within its containing tube, with vertices of the sensor array in contact with the inside wall of the containing tube, to immobilize the segments within said containing tube.

In another embodiment, the borehole is non-horizontal and at least some of the added compression is provided by gravity. In another embodiment, the borehole is not lined and the medium surrounding the borehole is subsequently allowed to flow in around the array, thereby filling the borehole and supporting the array. In another embodiment, the borehole is not lined and the borehole is subsequently filled with a compressible medium.

In another aspect there is provided a method of forming a ditch for an array, the method comprising: placing or forming raised portions along the bottom surface of the ditch to form serrations or sinuations; draping an array along the serrations to form an axially extensible shape in a vertical plane; and filling in the ditch.

In another aspect there is provided a method of calculating the spatial frequency components of a sinuated, zigzag, or helical path in a surface, the path shape a function of distance along a first cartesian axis, the spatial frequency components being relative to the first cartesian axis and a second cartesian axis orthogonal to the first, the two cartesian axes forming a first plane, the method comprising: defining straight line segments from a first location along the waveform of a first spatial frequency component to a second location along said waveform, the first and second locations being separated in phase by 90 degrees; defining a midpoint of said line segment; repeating the definition of line segments and midpoints for a multiplicity of points at intervals along the waveform of the first spatial frequency component; defining a medial axis containing the midpoints; repeating the definition of a medial axis for the waveform of each spatial frequency component for another cartesian plane orthogonal to the first cartesian plane and containing the first axis; using the medial axes as a measure of the shape of the surface at a first time; and using medial axes from subsequent times to measure changes to the shape of the surface.

In another aspect there is provided a method of forming a sensor array into a sinuated path on at least a portion of a cylindrical surface, the method comprising: placing the sensor array in a containing tube, the sensor array being loose within the containing tube when the tube is straight; affixing pins or posts to the cylindrical surface; weaving the containing tube between the pins to form sinuations on the cylindrical surface, the inner surface of the sinuated containing tube touching the segments of the array at the ends and near the middle, the curvature of the containing tube within the cylindrical surface less than or equal to the curvature of the cylinder, to set intimate contact between the sensor array and the containing tube during installation; and applying a compressive axial force from end to end of the containing tube to maintain intimate contact between the containing tube, the surface, and the pins or posts, thereby minimizing fastening hardware, speeding installation and removal, and improving the accuracy of data.

DESCRIPTION OF THE FIGURES

For a better understanding of the present invention, as well as other aspects and further features thereof, reference is made to the following description which is to be used in conjunction with the accompanying drawings.

FIG. 2: 3D view of a helix in a bounding box.
FIG. 3: XZ Elevation view of a helix.
FIG. 4: YZ elevation view of the helix of FIG. 3.
FIG. 5: Generating triangle for helix.

FIG. 40: Elevation view of non-straight sensor array in casing, with constant bend and twist along path.

FIG. 41: Elevation view of non-straight sensor array in casing, long joints generally helical, and rigid bodies locked in place by forces and moments of helix.

DETAILED DESCRIPTION OF THE INVENTION

Figure 1:
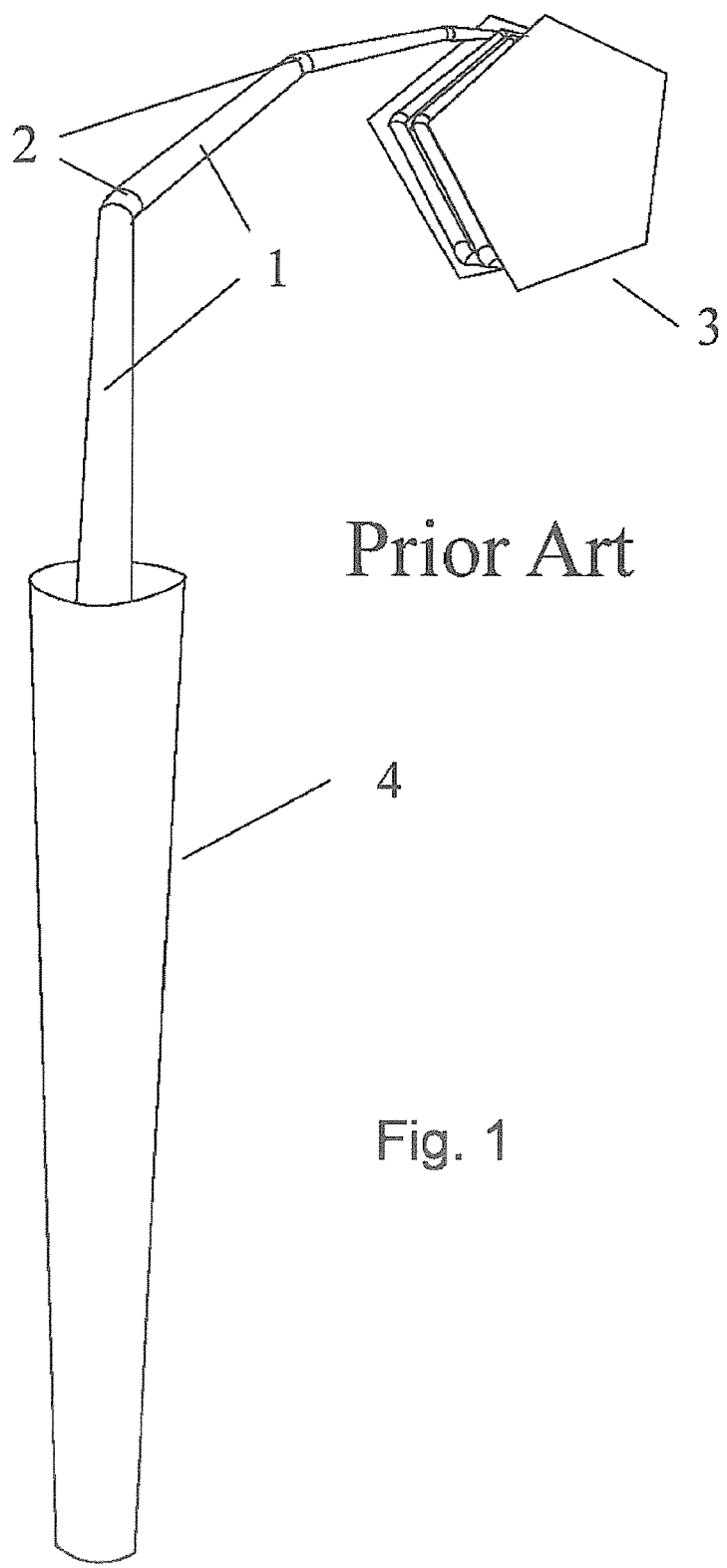
FIG. 1: Prior-art SAA being unreeled into a borehole.

As used herein, the term "World Coordinate System" or "WCS" is meant to refer to a set of cartesian axes referenced to Earth, or any other massive body. Without a rigid body in an array of rigid bodies having a known reference in both position and orientation to the WCS, it is still possible to know the shape of the array, but the orientation of the shape in the gravity field will only be partly known (azimuth will not be known), and there will be no positional information relative to the source of gravity. Gravity has a direction toward the center of a mass. "Gravity vector" refers to this direction. So does "the direction of gravity", which is what is referred to as "vertical" on Earth.

The above description will be seen to include paths for the array that:
  are sinuated or zig-zagged within a surface, or
  are helical, or
are comprised of segments generally following one of the above choice of paths.

In any case above, the medial axis can be at any angle from horizontal to vertical, or can be curved, such as in a circle. A smooth (non-segmented) helix can be considered a "3D sinuation". A segmented helix can be considered a "3D zigzag". Conversely, a sinuation can be thought of as a "2D helix". All these paths "cyclically surround" a medial axis: they cross the medial axis in a 2D view of the path, usually repeatedly. All such paths may be referred to as "cyclical paths". A non-straight sensor array may be referred to as a "cyclical array" for purposes of this invention. A strict definition of "cyclical" includes "recurring at regular intervals". In this patent specification, a broad definition of cyclical is intended that encompasses paths that cross a medial axis usually repeatedly, but may have nearly or even strictly random intervals between crossings. Fourier theory provides for always finding spectral components of any path that are themselves cyclical in the strict sense (they are sine waves), so there should be no concern about "regular intervals". The properties that are more important include containment within a surface to be measured, the ability to define a medial axis using the path data, and the properties of extension and compression.

Where lateral deformations in the horizontal plane are to be provided from a path having a generally horizontal medial axis, the number of contiguous rigid bodies in non-horizontal portions of the path must be sufficient to permit the movement. For instance, a zigzag path wherein each leg (a leg is a "zig" or "zag") is limited to one rigid body, and wherein the joints cannot twist mechanically, and the joints are very short, cannot easily be deformed out of its plane. But if two or more rigid bodies are allowed per leg, then it can. Deformation is also made possible by lengthening the joints, which can be done without significantly compromising torsional stiffness.

Forms described in this disclosure must be non-straight and capable of axial extension, compression, and lateral deformation. Prior-art SAA and inclinometer geometries which follow generally straight paths and that have a medial axis generally the same length as the path, are excluded from this disclosure. In this disclosure, the medial axis takes on the role of describing the path of a "virtual" or "imaginary", usually straight (non-cyclical) array that is axially extensible and compressible.

In this description, "ribbon" refers to a rectangular solid that is long, with modest width and low thickness, so that it will bend in 1DOF and mechanically twist in 1DOF, but cannot bend out of its plane. An example would be a flat plastic ruler. For this invention, a preferable ribbon would be a flexible circuit board with the sensors and ancillary circuitry mounted to its surface and between its layers. If rigid bodies like MEMS accelerometers are mounted on a circuit board, they will create a discontinuity of bend and twist at their location, so that the circuit board is essentially a set of rigid bodies connected by flexible joints between the bodies.

As referred to herein, the term "tilt" is synonymous with "orientation". The tilts of concern in the present description are roll, pitch, and yaw. A vertical cylindrical rigid body can roll about the vertical (Z) axis, pitch in an east-west (X) plane, and yaw in a north-south (Y) plane (these azimuthal planes are examples only; any orthogonal vertical planes could be designated).

In general terms, there is described an array of rigid bodies following a non-straight path, cyclically surrounding a medial axis. Some or all of the rigid bodies are fitted with sensors for measuring tilt in at least one degree of freedom (DOF). Normally all rigid bodies would be fitted with sensors, but in some cases it is possible to eliminate some if the "empty" rigid bodies are known to have tilts that can be predicted from the geometry of the installation, based on measurements from nearby "filled" rigid bodies.

Joints between the rigid bodies are defined such that they can be modelled as 2DOF bend-bend hinges, or in the case of ribbon joints (wherein the joints are flexible in 1DOF of bend and 1DOF of mechanical twist), as 2DOF bend-twist "hinges", always rotating about a point. Thus, the mathematical model for these cyclical arrays is a polyline comprised of line segments meeting at vertices. In simple terms, the implication is that no translation at the joints is allowed, over the range of desired angular excursions. This condition is embodied in the restriction that the joints have bend and/or twist that is monotonic (all of the same angular sign or "direction") and constant throughout the joint length. This is true of most short flexible joints, of longer joints that are also stiffer, and of even longer joints that are constrained to be in helical shape. Helices have constant bend and mathematical twist. For very large angular deformations, the hinge assumption will lead to some inaccuracy. This can be corrected using algorithms to move the hinge point slightly as a function of angle.

The invention includes a "medial axis", which is a conceptual curve useful both in describing a cyclical path that "surrounds" the medial axis, but also assists in reducing surface measurements to linear ("straight", or non-cyclical) measurements for purposes of comparisons to data from linear instruments. There is a mathematical definition of "medial axis" relevant to polygons. The concept here is similar but since a cyclical path is not a polygon, the definition for this invention is not directly identical to that for a polygon. An algorithm for finding the medial axis of this invention is given herein, but is not exclusive. Other methods may be used, since the medial axis here is as stated: a device of convenience.

The non-straight cyclical path of the invention permits extension or compression along the medial axis. If a flexible tube is used to contain the rigid bodies and joints, then the curvature of the path can provide a means of "snugging" or otherwise securing the rigid bodies within the curved tube, circumventing the use of swelling joints. The curved path also permits snugging or securing the rigid bodies to the inner surface of a cased or uncased borehole, tunnel, or shaft, because under axial compression, cyclical shapes will expand laterally.

Tilt sensors for the invention, and for prior-art SAA, are preferably accelerometers. MEMS accelerometers are comprised of masses held by spring suspensions that permit movement proportional to the force of gravity, which varies as the cosine of the "tilt" angle between the direction of movement of the mass (set by the spring suspension), and the direction of the gravity field, which is usually portrayed by a "gravity vector" perpendicular to the surface of the earth. Since the gravity vector is related to the earth, the tilts (also called orientations) measured are referenced to the WCS. A sensor array relying only on measurement of tilt requires that at least one point along its length have a known position in the WCS, otherwise the data provide a correct shape and orientation of the sensor array, but its position is unknown in the WCS.

MEMS accelerometers are available that respond to static tilt and also to dynamic vibration, by virtue of the inertia of their spring-suspended masses. Thus, any array containing MEMS accelerometers can be adapted to measure vibration as well as shape.

MEMS accelerometers are available as integrated circuits in a "package", which is a rigid body containing up to three orthogonal accelerometers, each measuring along an axis (e.g. X, Y, or Z). In triaxial accelerometers (those with three orthogonal axes), the mass may be shared by two of the axes. Position of the mass is measured inside the MEMS, by interdigitating fingers carrying electrical charges. The package can be used directly as a rigid body, or mounted securely within another rigid body, such as a rigid tube or box. Multiple single or dual-axis MEMS can be mounted within a rigid body. The location within the body is not important to static tilt measurement, since all parts of a rigid body tilt the same. Typical dimensions of MEMS accelerometers are 1×4×4 mm.

Because of the cosine response of MEMS accelerometers, each accelerometer has a maximum response to tilt for a particular range of tilt angles. Response, or voltage change per degree of tilt, can be found from the derivative of the cosine-shaped output. Response is the negative sine of the tilt angle, so is greatest in magnitude when the response curve of the accelerometer is near a "zero-crossing" of the cosine curve. Response at +/−60 degrees of the zero-crossing is attenuated by 50%, and falls off rapidly for angles beyond +/−60 degrees, becoming virtually useless at a 90 degree deviation from the zero-crossing. Thus, if sensors with various axes are available within a rigid body, the ones with maximum response are generally chosen to provide the measured tilt values. For cyclical arrays undergoing a wide range of angles either along their lengths or over time, different accelerometers may be used at different times or at different locations along the array. In some cases, algorithms are used to obtain optimum values of tilt using more than one sensor for a single tilt. If all three axes (X, Y, and Z) are instrumented with MEMS accelerometers, then a rigid body with those three sensors can provide accurate dynamic accelerations over a full spherical range, and static (gravimetric) accelerations over the full spherical range except for rotations directly about the gravity vector.

Calculation of shape from tilts is known from the prior art. In general, an array of rigid bodies separated by flexible joints can be portrayed as a polyline (line segments meeting at vertices), whose vertices represent the joint centers.

Lengths of the line segments are usually taken to be the joint-center to joint-center distance when the array is straight. For a vertical array extending in Z, and bending in X and Y, X and Y tilt sensors are sufficient to sense the overall tilts of the rigid bodies. The Z sensor is needed only to report if the array is "upside down" or not. It is essential to constrain the joints to have either 1DOF of bend and 1DOF of mechanical twist, or 2DOF of bend without twist, or the azimuths of the X and Y sensors within the WCS will not be known. With the joint constraint, it is possible to solve for X and Y tilts and to know their azimuth (compass) directions, even far from a reference end for the calculation. Constraint in inclinometer systems is provided by grooves in the inclinometer casing. The rigid bodies of inclinometers have wheels that fit into the grooves. For SAA, the joints are built to keep twist negligible but permit 2DOF bend, or for ribbon-shaped forms of SAA, the joints have 1DOF of bend and 1DOF of twist. The constraint allows calculation of the 2DOF orientation of each segment relative to the one before, based on X and Y tilts.

Calculation of shape for horizontal prior-art straight arrays is limited to shape within a vertical plane containing the path of the array. Only the Z sensors are needed.

The introduction of cyclical paths for arrays enables a great many more measurement possibilities, because the sensors can be at a wider variety of angles, thereby avoiding deficiencies of straight-line arrays. For example, straight-line arrays that are horizontal cannot gravimetrically measure movements of the sensors that rotate solely about the gravity vector. The term "rotate" is understood herein to mean typically very slow rotations: gravimetric inclinometry of any sort does not rely on time-integration of dynamic acceleration to make positional measurements. Rotation about the gravity vector does not produce any output, since gravity is symmetrical about its direction. This prevents measurement of any movement of a horizontal straight array within a horizontal plane. In other words, "yaw" cannot be measured. The yaw problem holds up to about 30 degrees from horizontal, because of the very small changes in acceleration due to yaw, although some measurements are possible at shallow angles even down to 10 degrees from horizontal, if extreme measures are taken. But sinuation of cyclical arrays in a vertical plane provides a means of measuring movement within a horizontal plane, as will be shown below.

Another example of measurements enabled by cyclical paths for arrays is the simultaneous measurement of subsidence (vertical compression), or of vertical expansion, along with lateral deformation (shear in a horizontal plane). This is enabled by the ability of a cyclical path to expand or compress axially, and to be completely defined by tilt measurements.

Cyclical paths can also generate better means of securing rigid bodies within containing surfaces, due to lateral expansion upon axial compression.

Cyclical paths can also provide for more room within a containing surface. For instance, a helical array on the inner surface of a cylindrical borehole or casing can still measure the shape of the casing. Since the casing can be larger without a secure fit being compromised, a large amount of room may be contained within the casing, which also holds the helix. The extra space can be used to accommodate abrupt deformation of the containing surface due to impingement of rocks or other hard objects. This can lead to longer service life for monitoring arrays, and enable extraction of arrays after more service life.

FIG. 1 shows a prior-art SAA being unreeled into a borehole. It has rigid bodies 1 joined by joints 2. Typically, the reel 3 is in a polygonal shape built to accommodate the segment-lengths (rigid body lengths) of the SAA. In this case a pentagonal reel is shown. The borehole 4 can be any cased or uncased hole in soil or drilled into a civil structure such as a pile, concrete or earth-filled dam. SAA can also be installed into straight runs of casing, horizontally in a ditch. It can also be in a generally circular arc in a tunnel, normally held within plastic casing. Each segment contains three accelerometers for measuring tilt and optionally useable for measuring vibration.

The prior-art SAA is a completely calibrated measuring instrument that can be formed into a shape without any additional structures, and will provide data representing that shape. All data exit the instrument on a single digital cable, due to use of in-array microprocessors and analog-to-digital converters. When the segments are vertical within approximately +/−60 degrees, 3D shape can be determined from the measured tilts and known lengths of rigid bodies and joints between them. When the segments are near-horizontal within approximately +/−60 degrees, software is used to provide only 2D data in a vertical plane, because of degradation of X and Y data within +/−30 degrees of horizontal. For near-horizontal sensing, mainly the Z tilt sensors are used (those with maximum response when segments are horizontal). The nominal 3D and 2D measurement ranges overlap, simply because it is more convenient to leave the software in either 3D or 2D mode. Both modes fall rapidly in accuracy beyond their +/−60 degree range.

The terms "non-horizontal" or "near-vertical" are used herein to denote segments that are sufficiently vertical to allow determination of 3D orientation and position data from the segment. The terms "non-vertical" or "near-horizontal" are used herein to denote segments that in isolation from other segments, allow only 2D measurements. The segments suited to 2D measurements from the segment alone, require only the use of the Z tilt sensors, whose output is independent of the roll angles of these near-horizontal rigid bodies. The segments suited to 3D measurements (non-horizontal segments) require known alignment of the roll angles of the rigid bodies about the path of the array, so that the X and Y sensors will be aligned about the path of the array.

The terms "near-horizontal", "non-vertical", "near-vertical", and "non-horizontal" are also used in this description to describe the tilts of planes, in the context of prior-art SAA limitations on 3D sensing within the broad ranges of +/−60 degrees from vertical, and 2D calculations within +/−60 degrees of horizontal. These are not hard limits, but limits where accuracy begins to fall off rapidly (as the cosine of the angle) should they be exceeded.

For the present invention, the concept of using a non-straight path to accommodate both extension and lateral deformation can be explained in general form using a 3D helix.

FIG. 2 shows a helix 5, in a 3D view within a bounding box 6. The "bounding box" is simply an aid to visualization. A set of X, Y, Z axes 7 defines a coordinate system for the helix. FIG. 3 is an XZ elevation view of the helix 5 and bounding box 6, with a 2D set of axes 7. FIG. 4 is a YZ elevation of the same helix 5 and bounding box 6, with a different set of 2D axes 7.

FIG. 5 shows a triangular surface ("generating triangle") 8, which can be rolled into a cylinder to form one turn of a helix. Height of the triangle, 9, is $2\pi c$. Base of the triangle, 10, is $2\pi r$. Similarly, height of one turn (the "pitch") of the helix so formed would be 2πc. "c" is the "pitch height factor". Circumference of a cylinder bounding a helix (cylinder is not shown) is 2πr.

The parametric equations for a helix are $$x = r\cos(p) \tag{1}$$

$$y = r\sin(p) \tag{2}$$

$$z = cp; \tag{3}$$

where r is the radius and p varies from 0 to 2πr. The two elevation views arise from the cosine and sine functions in equations (1) and (2).

We can define α, the "pitch angle" of the helix as:

$$\tan(\alpha) = c/r. \tag{4}$$

and can call c/r the "pitch ratio".

Helixes have constant curvature and twist:

$$k = r/(r^2 + c^2) \tag{5}$$

$$t = c/(r^2 + c^2), \tag{6}$$

where κ is curvature and t is twist.

Helixes are mathematical space curves that have constant bend and twist along their lengths. It is important to note that mathematical twist of a space curve is not necessarily the same as mechanical twist, which is caused by torsional shear of a tubular solid. A space curve has no thickness, so cannot have mechanical torsion (mechanical twist) along its length. A flexible cylindrical solid, such as a rubber rod, can be formed into a helix and may have significant mechanical twist. A straight rod may have mechanical twist, but can never have mathematical twist, because its central axis is a straight line. For the helical rod, the magnitude and direction of the mechanical twist may be quite different from the mathematical twist calculated for the path of the center of the rod (a space curve). In this description, when it is said that a flexure or joint has no twist, or allows no twist, this is referring to the mechanical twist. The mathematical twist is determined entirely by the shape (e.g. the mathematical twist of a helix of a given diameter and pitch). The mechanical twist is allowed, or not, by the torsional stiffness of the material. Torsional stiffness is the amount the ends of a sample, such as the ends of a tube, can be rotated for a given moment applied end-to-end when the sample is straight.

Torsional stiffness, like stiffness of any material, applies within a range of applied torques over which the stiffness is generally linear and any twist generated by torsion returns elastically after it is removed. When a torsionally stiff tube (or rod, hose, etc.) is formed into a helical shape, the mathematical twist of the helical form (a space curve without thickness) will result in application of torsion to the tube. In this description it is assumed that this torsion is allowed to be applied and is kept within the elastic limits of the torsional degree of freedom of the tube. For helixes with few turns per axial length, the torsion will be very low and will affect very minimally the azimuthal alignment of the sensors on the helix. For instance, a helix with radius of 50 mm and a pitch angle 10 degrees from vertical will have a twist of 0.33 degrees per 3 m of length, which is a typical specification for inclinometer casing. In practical terms, keeping the mechanical twist of an array at a minimum when forming a helix amounts to allowing the tube to take on the mathematical twist as the helix is formed without restriction or interference. If the pitch angle is more horizontal, so that more mathematical twist exists, then more torsion will be applied to the tube. The system must be designed to keep this torsion within the elastic limits of the tube. The tilt sensors can be used to read the amount of twist and the mathematics used to calculate the shape of the helix can be suitably adjusted. The reading of twist by the sensors becomes more accurate as the rigid bodies become more horizontal. This is a consequence of the increasing magnitudes of both ax and ay in atan(ax/ay), which is the "roll" angle of a rigid body, and ax and ay are the static X and Y accelerations of the sensors most sensitive to tilt when the rigid body is vertical.

So when said herein that flexures or joints "cannot twist", "resist twist", are "without twist", are "torsionally stiff", or "have no mechanical twist", or are "torsion-resisting", or have "high torsional stiffness", it is meant that the torsion is within elastic limits and the twist is either negligible or can be corrected using the known geometry, and measurements of roll angle. Preferably, the mathematical twist is kept negligible, which can usually be accomplished by selecting a favorable geometry for the shape of the array.

The path length (arc length) along a helix corresponds to the hypotenuse of the generating triangle. For a single turn of the helix:

$$S = 2\pi\mathrm{sqrt}(r^2 + c^2), \tag{8}$$

where S is the path length and "sqrt" is the square-root operator. The present description is concerned with helices with a constant path length, since these represent a concatenation of rigid bodies and joints always having the same end-to-end length even when sinuated.

Next, the shape of the helix can be considered if it is a physical body undergoing compression or extension (acting like a spring), with unchanging path length. Thus S is constant, so $$A = \mathrm{sqrt}(r^2 + C^2) \tag{9}$$

is also a constant.

We can solve for the radius as a function of helix height, keeping the number of turns of the helix constant, so that the ends of the helix are always at the same azimuthal angles around the circumference of the generating cylinder:

$$r^2 = A/(1 + (\tan(\alpha))^2), \tag{10}$$

Figure 6:
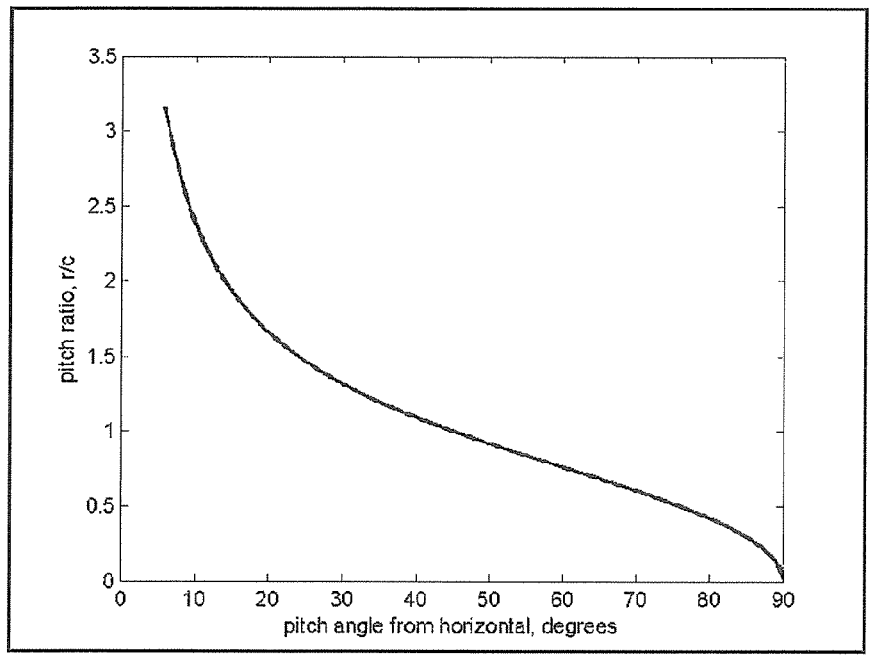
FIG. 6: Graph of pitch ratio vs. pitch angle for a helix.

FIG. 6 shows the pitch ratio, r/c, as a function of α, the pitch angle resulting from compression of the helix. The slope of this line is of importance. It relates how much the helix will expand laterally when compressed axially. The slope can be normalized to show the percent change in radius divided by the percent change in pitch height factor. This ratio of percentage changes is shown in FIG. 7.

Figure 7:
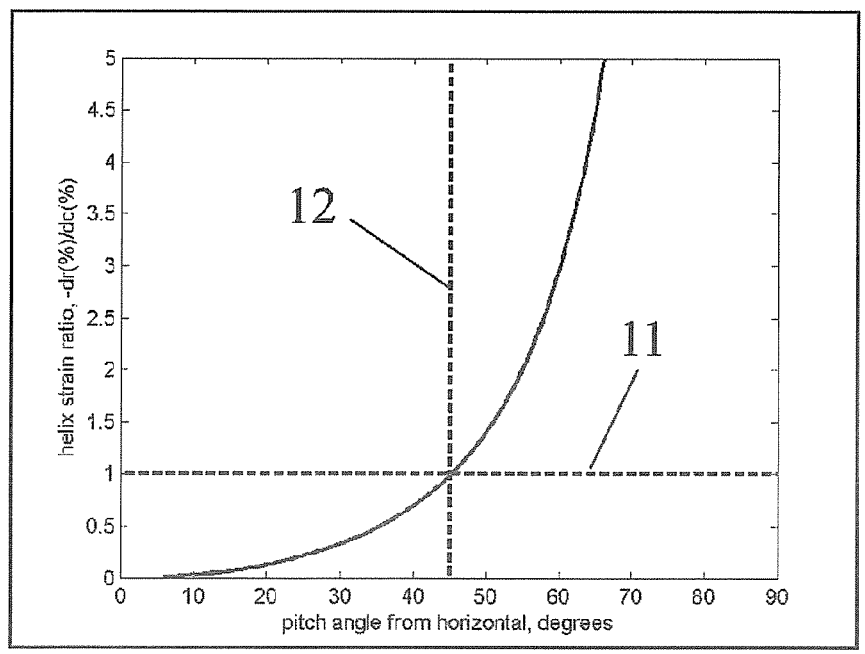
FIG. 7: Graph of helix strain ratio vs. pitch angle for a helix.

The ratio −dr(%)/dc(%) in FIG. 7 (the "helix strain ratio") is very similar to the ratio of transverse to axial strain used to define Poisson's ratio. Poisson's ratio relates the lateral strain of a solid material to the axial strain. The helix strain ratio is relevant, for example, when a helical sensor array is deployed into an uncased borehole and it is desired to have the array move with axial compression of the soil surrounding the borehole. One does not want the diameter of the cyclical array to expand excessively upon axial compression, as the borehole cannot expand beyond the limits of Poisson's ratio. The above helix strain ratio of FIG. 7 can be used to design a pitch for the helix that will allow movement with the soil.

The helix strain ratio of FIG. 7 is also relevant to securing a helical array within a rigid cylinder, such as borehole casing. It can be seen that the diameter of any helix will expand upon axial compression, such as from gravity in a vertical casing. The expansion would be prevented by the casing, but would result in strong contact forces between helical array and casing. This is also true for the two-dimensional case of lateral expansion of a sinuated or zigzag array upon axial compression. In FIG. 7, a ratio of 1.0 is indicated (dashed line 11), which occurs for a pitch angle of 45 degrees (dashed line 12). At that angle, for example, an axial compression by 1m of a helix 100 m long and 100 mm in diameter would result in an expansion of its diameter by 1 mm.

Figure 8:
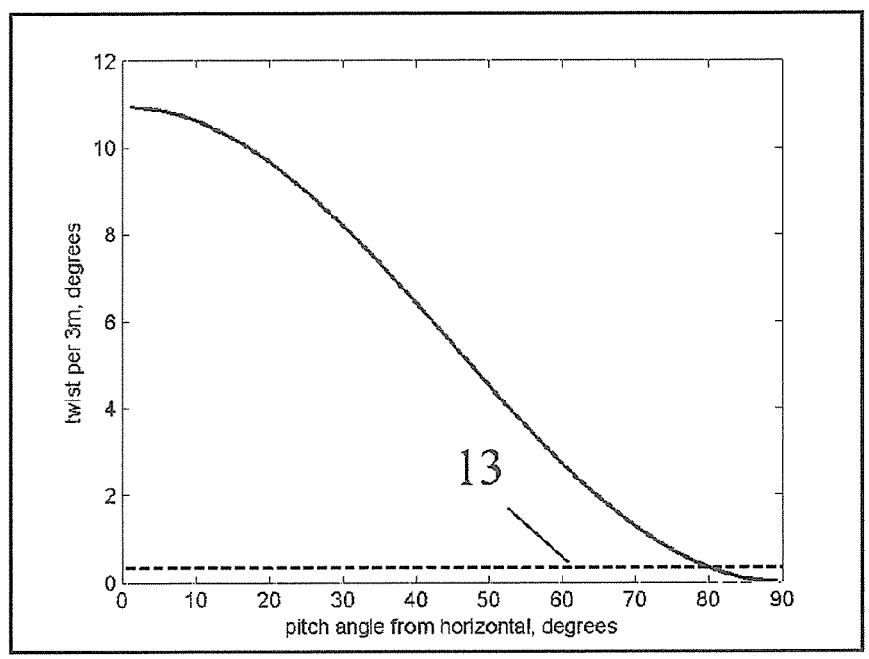
FIG. 8: Graph of twist per 3 m vs. pitch angle for a helix.

FIG. 8 shows twist of 3 m of a helix with a radius of 50 mm, plotted against the pitch angle. At about 80 degrees of pitch angle, the twist per 3 m is approximately the same as a typical specification for inclinometer casing: 0.33 degrees per 3 m length of casing (dashed line 13). 80 degrees or above would be a typical pitch angle for rigid-body segments 0.5 m long and up. For instance 84 degrees is a slope of 1:10 (run to rise), which would represent a 500 mm rigid body tilted by 50 mm from one end to the other, which can only be accomplished in a narrow hole if the rigid body is very narrow. For measuring subsidence in an uncased borehole, pitch angles of around 45 degrees or less are required, implying twist of 5-6 degrees for 3 m of borehole. This would affect azimuth of the tilt readings to a significant degree in deep holes, but can be corrected because the pitch angle of the helix will always be known from the tilt measurements of the rigid bodies. Increasing the diameter of the hole has the effect of reducing the twist per turn; the shape of the curve remains the same.

Figure 9:
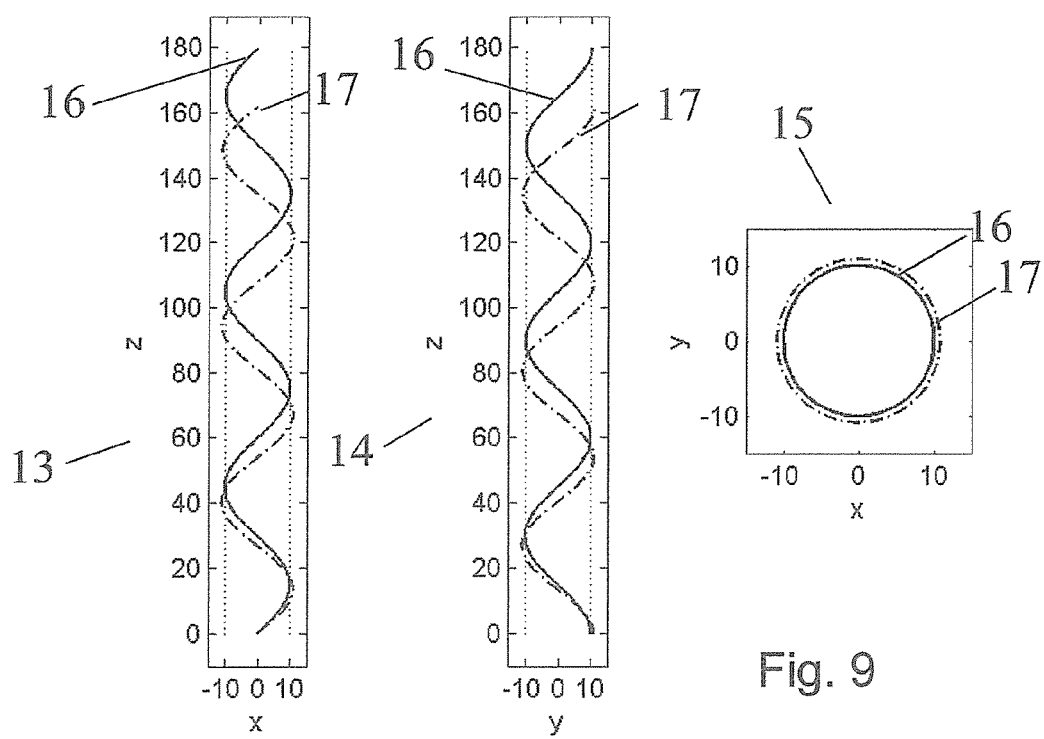
FIG. 9: Orthogonal elevation and plan views of a helix undergoing axial compression.

The lateral expansion of a helix in response to axial compression is shown in FIG. 9, which includes XZ and YZ elevations and an XY plan view (items 13, 14, and 15 respectively). The views show the original helix 16 and the axially compressed helix 17. The XY plan view 15 most clearly shows the increase in diameter due to compression. The curves were calculated using the helix equations (1)-(9).

Vertical subsidence (compression in the vertical axis) of soil can be measured by a helical array mounted in an uncased borehole. In the general case, vertical subsidence is not uniform with elevation along the borehole. But a helix has sufficient degrees of freedom that its pitch can change along its length, according to the amount of subsidence at each particular elevation. Expansion of the helix with subsidence (axial compression of the helix) will result in outward forces that can keep the helix locked to the soil. At a minimum, the expansion should match the Poisson ratio of the soil. In many cases the expansion can be larger than dictated by the Poisson ratio, as the rigid bodies will tend to press into the soil to some extent. For very small ranges of subsidence, grout or compressible fill may be used to fill the excess space in a borehole, if the fill is designed to match the compressibility of the soil. For expansive soils, the helical strain ratio should be larger than Poisson's ratio, so that contact is maintained with the borehole during expansion.

Similar conditions may be placed on non-helical non-straight cyclical sensor arrays that surround a medial axis. Any two segments of this more general case can have a strain ratio analogous to the helical strain ratio, whereby the lateral extent of the two segments is related to the axial extent and must be matched to the Poisson's ratio of the soil. So where the helical case is described here, it may also be extended to the more general case of non-straight sensor arrays that surround a medial axis.

The medial axis and its calculation will be discussed in greater detail later in this description. For now, it is sufficient to think of it as a center line of the helix (the center line of the generating cylinder).

As the soil subsides, the helix will compress vertically, in general by different amounts at different elevations. The medial axis will get shorter, and the "second vertices" along the medial axis (projections of the "first vertices" representing joint centers of the cyclical array) will change elevations according to the subsidence at each elevation.

Lateral deformation of a helix will result in deformation of its calculated medial axis, in a manner very similar to the deformation of a real linear SAA at the location of the medial axis. Since the medial axis is unaffected, except in length, by vertical subsidence (axial compression), the measurements of axial compression and lateral deformation can both be made by the same array, and provide mutually independent data.

Figure 10:
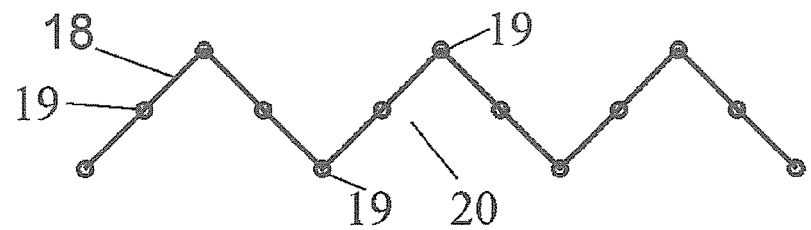
FIG. 10: Elevation view zigzag path with representations of segments and joints.

FIG. 10 shows a zigzag path with line segments 18 representing axes of rigid bodies and circles 19 representing joints enabling articulation of the path. The path is comprised of legs 20 with, in this case, two rigid bodies per leg (e.g. leg 20 extends between the two circles labelled 19 nearest the label "20"). In general, each leg of a zigzag having non-twisting (torsionally stiff) joints, the zigzag in a plane, should have at least two rigid bodies if the joints are short, or it may not bend freely out of its plane. Longer joints can enable single segments in each leg. The difficulty with short joints is due to the non-twisting nature of the joints, combined with the sharp joint angles at the boundaries of the path. For a ribbon permitting one degree-of-freedom (1DOF) of bend and 1DOF of twist, it can be sufficient to have just one rigid body per leg.

Figure 11:
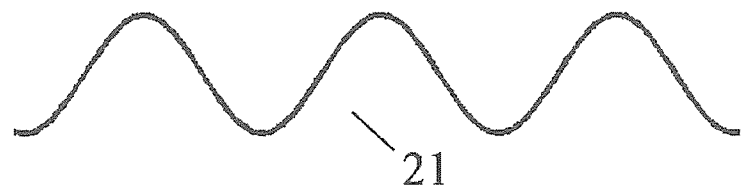
FIG. 11: Sine wave of spatial data from a cyclical path.

FIG. 11 shows a sine wave 21 of spatial data. It does not represent amplitude vs. time, but rather X vs. Z or Y vs. Z: positional data. In general any path, no matter how irregular, can be decomposed into a series of sine waves of different frequencies, amplitudes, and phases. The original path can be reconstructed from the series; i.e. the process is reversible. This spatial frequency content is usually calculated as a Fourier series, often using a Fast Fourier Transform (FFT) algorithm.

Figure 12:
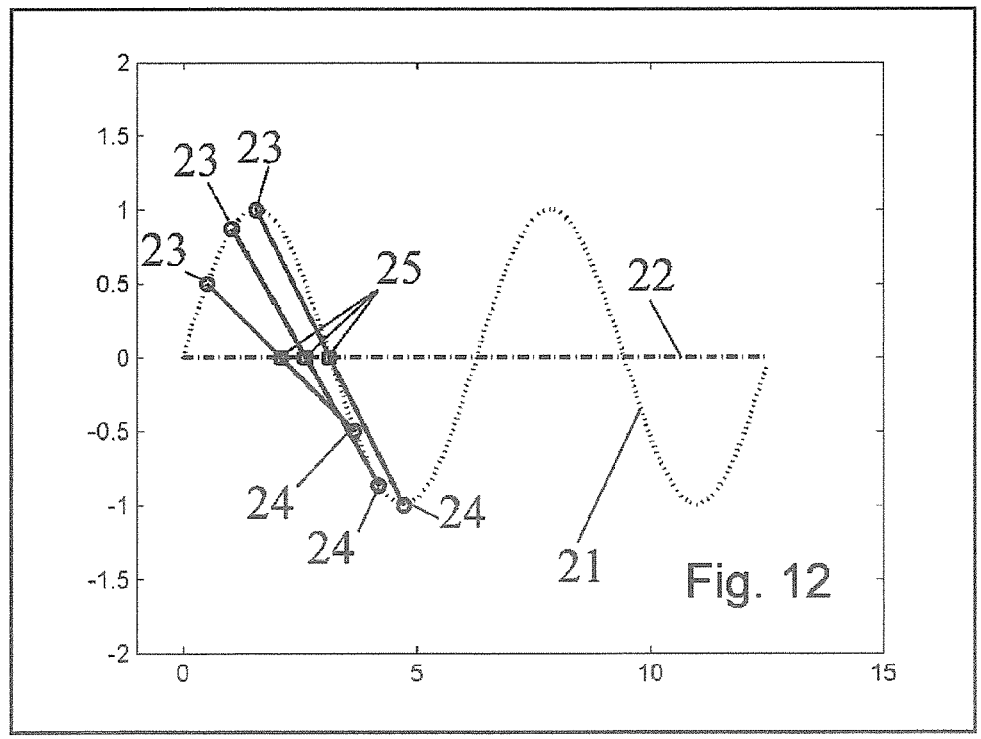
FIG. 12: Graph showing Calculation method for a medial axis of a sine wave.

FIG. 12 shows a sine wave that could represent a spatial frequency component of a segmented or smooth path, or the smooth path itself. It could represent the XZ or YZ data from a helix extending in Z. The XZ and YZ data can be thought of as data from different orthogonal "views", such as views 13 and 14 of FIG. 9. A medial axis 22 of the sine wave can be found by various operations. One example, a "medial-axis algorithm", is to draw line segments extending from first points 23 of the path to second points 24 of the path, 90 degrees out of phase with the first points. First points 23 and 24 are marked with circles. Midpoints 25 (square markers) of these segments can be used to draw a polyline (curve consisting of straight line segments) that in the limit as more closely-spaced line segments are used, becomes a smoothly-curved medial axis 22.

The medial axis will in general have to be extended somewhat at the ends to match the full length of its generating waveform. Algorithms commonly used to extrapolate continuously-averaged data may be used. In many cases it will be sufficient to define end lines based on the known length of the waveform, and simply continue to the end lines the medial axis at its outermost slopes.

Figure 13:
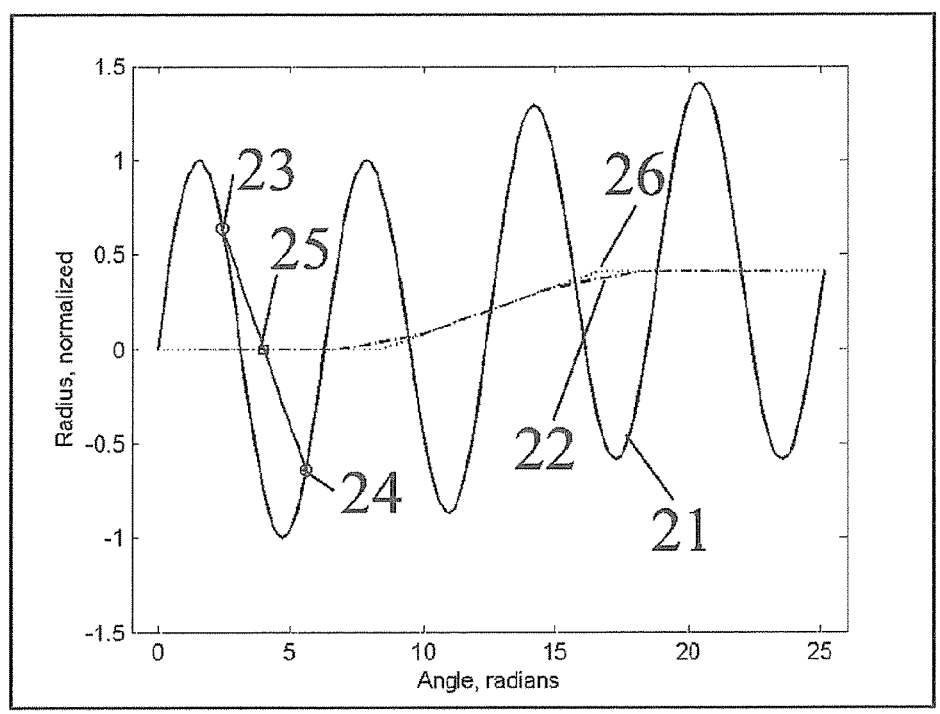
FIG. 13: Graph showing Calculated medial axis for deformed sine wave.

FIG. 13 shows a sine wave 21 deformed by adding a ramped spatial pulse (dotted line 26). The distorted sine wave 21 represents a distorted spatial frequency component of a path that has been deformed lateral (transverse) to its long axis. It could also represent an orthogonal view of one side of a helix that has been deformed laterally. The medial axis (dashed line 22) in FIG. 13 has been generated using the medial-axis algorithm described above in FIG. 12. For example, first points 23 and 24 separated by 90 degrees of phase are used to draw line segments with midpoints 25. All the midpoints are used to define a polyline (dashed line 22), which can be used as a medial axis. The difference between polylines 22 and 26 near the "corners" of the ramp can be reduced by using more points 23 and 24 to generate the medial axis.

Data from the medial axis can be used to monitor and evaluate deformation of a cyclical path (zigzag, sinuated, helical), in the same manner that data from a non-cyclical conventional array, such as an SAA, would be used if the array followed the medial axis.

Figure 14:
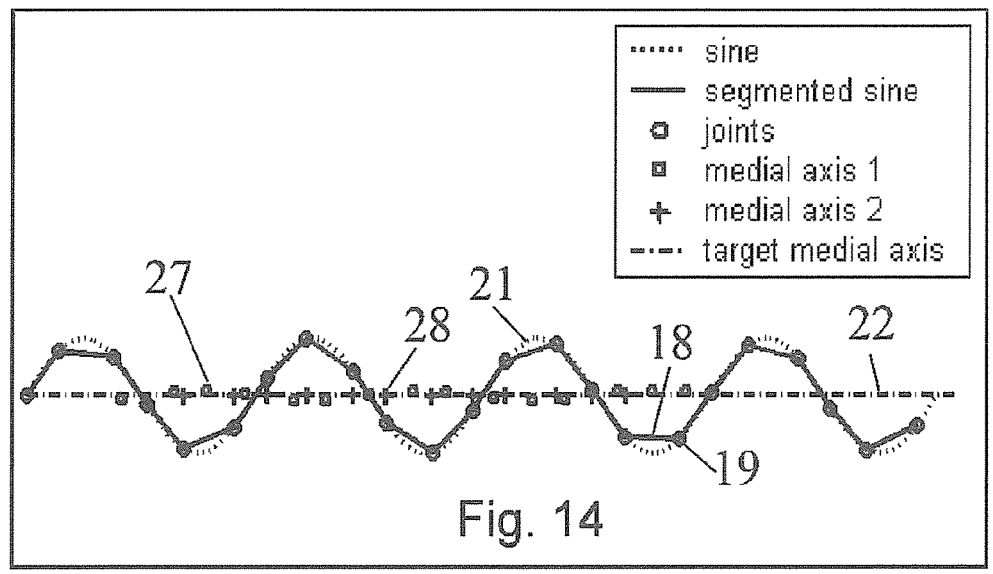
FIG. 14: Graph showing iterated calculation of medial axis from vertices of segmented path.

FIG. 14 shows a segmented path with line segments 18 and circles 19 representing, respectively, rigid body axes and their intersections in first vertices. The segmented path has a main spatial frequency content shown as sine wave 21 (dotted), which has been used to form a "target" medial axis 21, the "midline" of the sine wave. The medial-axis algorithm of FIG. 12 has been applied only at first vertices, to determine a first medial axis (square marks 27). It can be seen that because of the segmentation of the path, there is some deviation of the first medial axis from the target medial axis 21 (a straight line). However, a second application of the medial-axis algorithm to the first medial axis points 27, again using just the vertices (now of the first medial axis) as ends of line segments, leads to an almost perfectly-straight second medial axis ("+" marks 28). This is an example of iteration to converge on a final medial axis.

The medial-axis algorithm, or operations like it, can be applied to individual spatial-frequency components of any path, in any orthogonal view, to determine multiple medial axes at each frequency and each view. The medial axes can then be combined into one single 3D medial axis, by averaging at points, or other similar operations.

Figure 15:
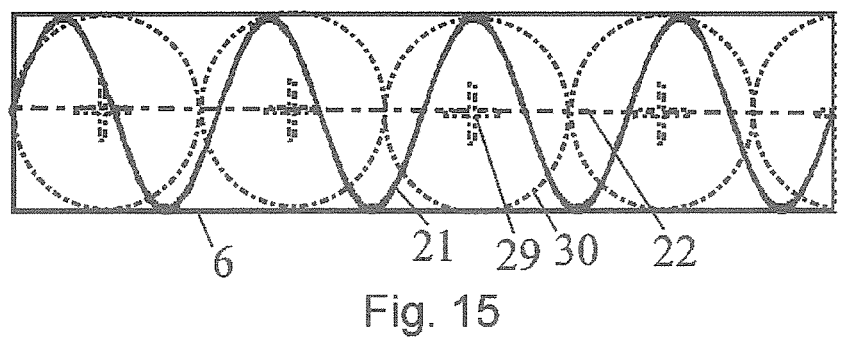
FIG. 15: Alternate calculation of medial axis from bounding polygon.

An alternate means of determining a medial axis for some cyclical paths is to surround the waveform with a bounding polygon, or a curve, and then to find the medial axis of the polygon using polygonal medial axis algorithms. For instance In 2D, the medial axis of a plane curve S is the locus of the centers of circles that are tangent to curve S in two or more points, where all such circles are contained in S. FIG. 15 shows a sine wave 21 bounded by a rectangular polygon 6. Centers 29 of circles 30 tangent to the polygon 6 define a medial axis 22.

Thus, for any shape of cyclical path, there can always be found a medial axis in up to three dimensions.

The medial axis is convenient for describing the general shape of a path. It also portrays the "center" of the shape even when the cyclical path is being compressed or extended along the general direction of the medial axis, such as when measuring subsidence and lateral deformation with the same helical-path instrument. However, in installations where subsidence is not a factor, and only deformation measurements are sought (no portrayal of the starting shape), the medial axis may not be required as part of the data set. In these cases, the deformation data could be calculated from differences in the shape of the helix, compared to a "starting helix". Graphically, the starting helix would appear in deformation graphs as a straight line, and deformations would result in lateral movement of the line. This is little different from deformation graphs of a prior-art inclinometer or SAA, where the first shape is always portrayed as a straight line, which then deforms with time, even though the first shape is in general not a straight line, due to errors in drilling and installation.

Joint centers are represented along graphical representations of the cyclical path as "first vertices". "Second vertices" are the projections of first vertices on the path onto the medial axis. The projections are along perpendiculars to the medial axis. The perpendiculars contain the first and second vertices. These "indirect" second vertices then can be used in the same fashion as "direct" vertices would be used on a graphical representation of prior-art inclinometer or SAA instruments: as representations of the locations of joint centers along the instrument path.

The case of an arc, such as a circle or portion of a circle, requires some more discussion. Arcs are important in measuring convergence. Convergence of a tunnel can be performed using an array of prior-art bend sensors, by running an array of rigid bodies in a circle (or an arc) around a cross section of a cylindrical tunnel. The bends (or bends derived from tilt sensors) are used to find the shape of the circle or arc after deformation, in the plane defined by the arc or circle. In this case, one may be tempted to use the equations of a circle ($x=r \cos(p)$ and $y=r \sin(p)$) to define a medial axis for the circle. But this is not analogous to defining the medial axis of a helix. A helix extends in z, so each view of the helix can be portrayed by a sine wave extending in z. In the case of a circle, the defining sine and cosine waves are in a plane, so the medial axis would be a point. The medial axis only becomes a line in the context of this invention, where movements of the arc out of its plane are permitted and measured. In that case one can find spatial frequency components of the non-planar shape of the array that extend in z and can be thought of as components of a helix.

Figure 16:
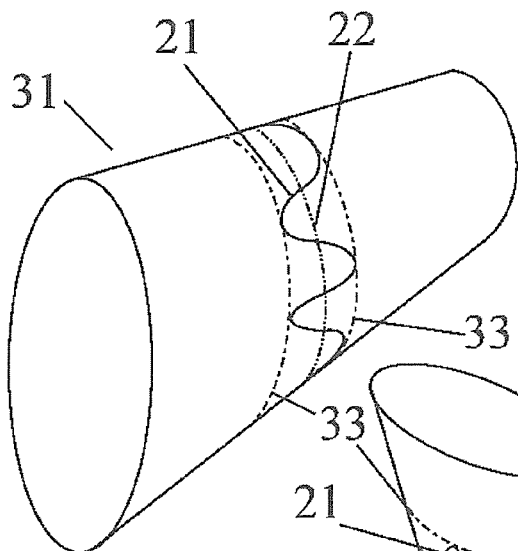
FIG. 16: 3D view of sinuated path in circular band on a horizontal cylindrical tunnel.
Figure 17:
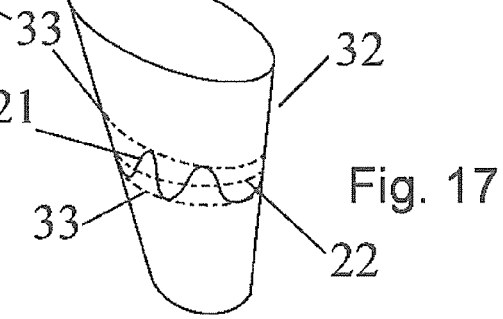
FIG. 17: 3D view of sinuated path in circular band on a vertical cylindrical shaft.

More data than previously available in the prior art of convergence measurement can be obtained by sinuating (or zigzagging) an otherwise circular path along the circumference of a horizontal tunnel (or a vertical or tilted shaft). An example for a horizontal tunnel 31 is shown in FIG. 16, and for a vertical shaft 32 is shown in FIG. 17. In both FIG. 16 and FIG. 17 the sinuated path 21 is bounded by two circular curves 33. The medial-axis algorithm can be applied to the sinuated path running around the circumference of the tunnel or shaft, resulting in an arc-shaped or circle-shaped medial axis 22. A band-shaped surface defined by the circular curves 33 contains the path, with the medial axis generally in the center of the band. New data, all derived from tilt sensors in the rigid bodies of the path, can be used to quantify twist of the band and deformation axial to the tunnel or shaft, as well as the prior-art data for movement of the medial axis toward and away from the center of the plane of the medial axis, within that plane. The data fully describe deformations of the band surface in 3D. Even uniform dilation or contraction of a band can be detected, albeit imperfectly, through changes in the wavelength and amplitude of the sinuations, which are a function of diameter. The imperfection arises from portions of the sinuated path that are near-horizontal, such as at the crown and the bottom of a horizontal tunnel. In those portions, there is little or no change of tilt for sensors that rotate about the gravity vector. However, the remainder of the band is sensed in 3D, so wavelength data are still useful. This is especially so because if the wavelength for the majority of the band changes, and no other deformations such as local convergence of the crown or bottom occur, then it may be inferred that uniform dilation or contraction of the band is most likely occurring. And, the imperfection is not relevant to shafts that are non-horizontal.

Figure 18:
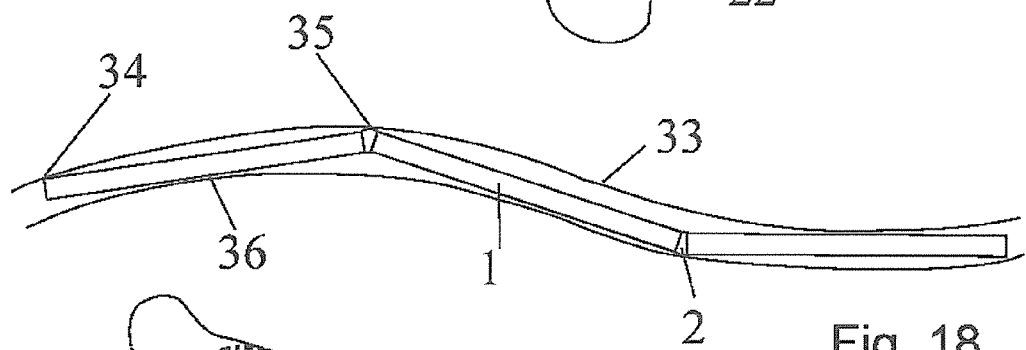
FIG. 18: Plan view of segments secured in a sinuated casing.

Another benefit of sinuation on a tunnel or shaft wall is improvement of fit of the rigid bodies inside a tube containing them. Prior-art SAAs are normally installed in flexible conduit slightly larger than rigid tubes forming the rigid bodies. The joints between rigid bodies are designed to swell under axial compression of the SAA; however this rarely secures the rigid bodies perfectly in the containing tube. If the flexible conduit is in an arc with the correct curvature, the rigid bodies will touch at their ends and middle, securing them perfectly. However, this curvature is only rarely the curvature of the tunnel or shaft surface. Sinuations allow another degree of freedom for securing rigid bodies within a flexible tube. The lengths of the rigid bodies can be designed to enable a loose fit in the flexible conduit at the tunnel curvature, but a tight fit in sinuations within the band-shaped surface. The sinuations may be adjusted at the site to produce a tight three-point fit of the rigid bodies within the band-shaped surface. Only a few standard lengths of rigid bodies need be manufactured, with or without swelling joints, to enable such a system. Tight fit of rigid bodies within a sinuated conduit is shown in FIG. 18. In this case, tight fit is defined by the rigid bodies touching at three points 34, 35, and 36. The tight fit is sufficient reason to sinuate, even when measurements out of the plane of the arc are not desired.

Figure 19:
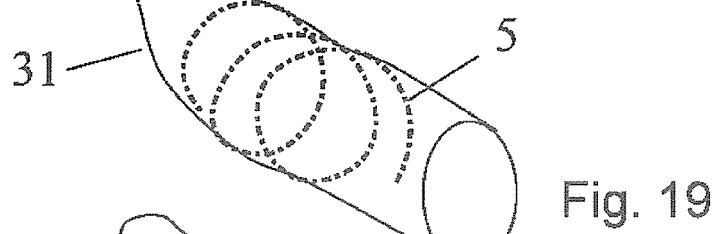
FIG. 19: 3D view of helical array on the inner surface of a tunnel.

Other paths are useful in tunnel and shaft measurement. Most convergence measurements with SAA in horizontal tunnels are done in conjunction with monitoring the crown or floor with a horizontal SAA, to monitor sag or rise of the SAA in a vertical plane containing the SAA. Much the same data as for multiple convergence arcs or circles and a long horizontal SAA can be obtained with a helix on the inner surface of the tunnel, with the axis of the helix horizontal, as shown in FIG. 19. The pitch of the helix 5 can be adjusted to change the intervals between data points along axial lines in the surface of the tunnel 31. Vertical shafts can also be measured in this way, with the axis of the helix vertical.

Figure 20:
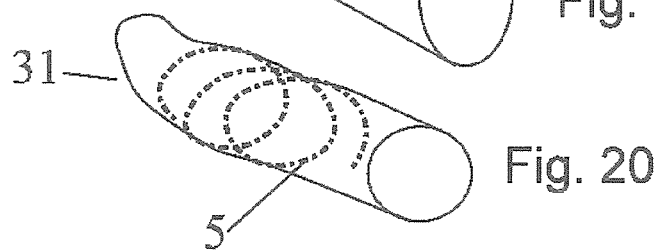
FIG. 20: 3D view of helical array of FIG. 19 after diminution of the tunnel (diminution exaggerated).

FIG. 20 shows the tunnel 31 and path 5 of FIG. 19, showing diminution of the tunnel diameter. The diminution of the tunnel and helix have been exaggerated in the figure. The diminution of the diameter can be sensed over a small range as the helix conforms to the new tunnel shape. However this can be improved by sinuation. If the path were to be sinuated as in the circular-band case of FIG. 18, the diminution could be measured over a greater range and with improved spatial resolution, along with all the other parameters measured in the circular-band case.

Figure 21:
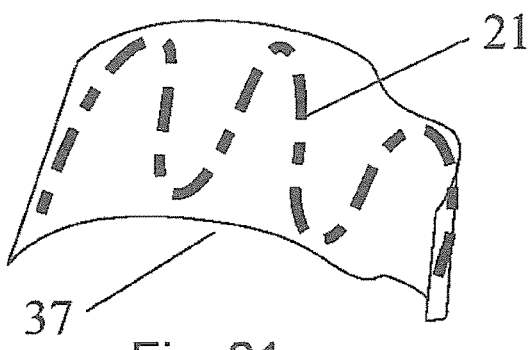
FIG. 21: 3D view of sinuated path on a curved surface in generally non-horizontal plane.
Figure 22:
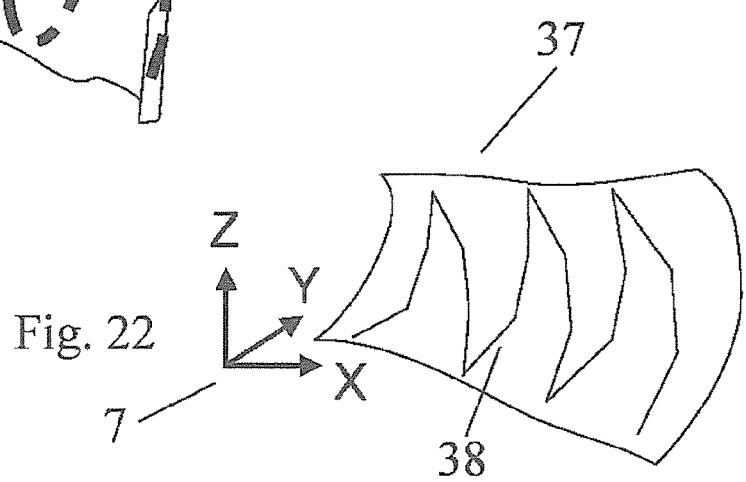
FIG. 22: 3D view of zigzag path on a 3D curved surface in generally non-horizontal plane.

Tunnel walls may also be measured with sinuated or zigzag cyclical arrays that are generally in a vertical plane. One rather general example is shown in FIG. 21. A cyclical array in a sinuated path 21 is on generally vertical surface 37. It could represent measurement of any vertical wall, such as the wall of a tunnel. If the tunnel is circular in cross section, then the surface of FIG. 21 would also be bent around a horizontal axis, becoming a fully 3D curved surface, as shown in FIG. 22 (in this case with a zigzagged array 38). Axes 7 define the 3D coordinate system.

Measurement of vertical surfaces with sinuations can lead to some missed data points near the peaks and valleys of the sinuations, where the slope of the sinuation is very low (nearly horizontal), if these portions bend such that rigid bodies are rotating about the direction of gravity (the "gravity vector"). However these portions can be rigidized within a local plane (such as by fastening to a backing plate) so that tunnel deformation is transferred entirely to the other parts of the cyclical array of rigid bodies. In the case of rigid bodies mounted on ribbons, constrained to 1DOF bend and 1DOF twist, rigidization at peaks and valleys would not normally be necessary, due to the mechanical constraints of ribbons. However, the ribbons may not be able to follow some surfaces very well, due to the inability of a ribbon to flex out of its own plane. In general, ribbons cannot follow curved surfaces in two DOFs; only one DOF of bend can be accommodated easily.

Figure 23:
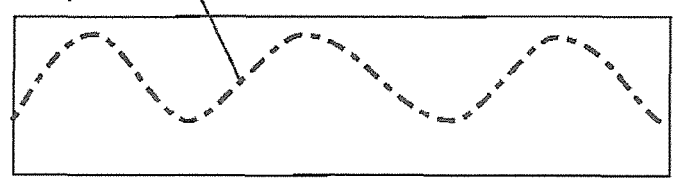
FIG. 23: Elevation view of sinuated path in a non-horizontal generally planar surface.
Figure 24:
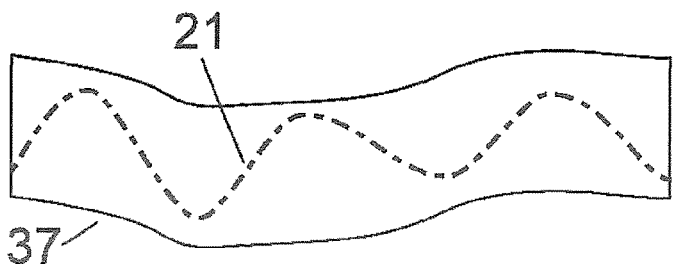
FIG. 24: Elevation view of sinuated path and surface of FIG. 23 after deformation within the vertical plane.
Figure 25:
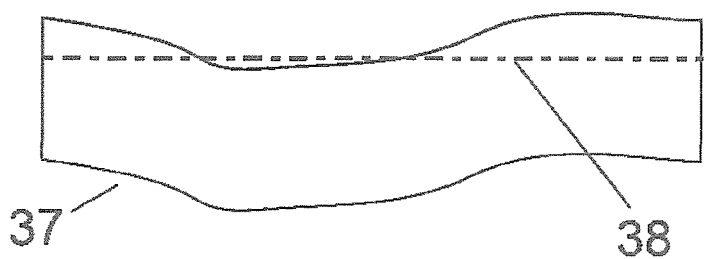
FIG. 25: Prior-art straight path bridging across subsidence region.

FIG. 23 shows the sinuated path 21 of a cyclical array in a vertical surface 37. This path is able to deform vertically, as shown in FIG. 24. For instance, if the cyclical array with path 21 were installed in a ditch beside railway tracks (the ditch would be filled in of course), erosion of the soil or bedding beneath the ditch could cause a drop in ground level, and it would be sensed by the sinuated array bending within its own plane 37, due to changes in tilt along the path. In contrast, the same surface is shown in FIG. 25, but with a straight prior-art SAA or inclinometer 38 indicated by the dashed line. Since prior-art SAA and inclinometer sensors are not extensible, the SAA or inclinometer would not be able to drop into a significant local depression (a subsidence), but would instead stay straight and no warning of bedding failure would be available.

Figure 26:
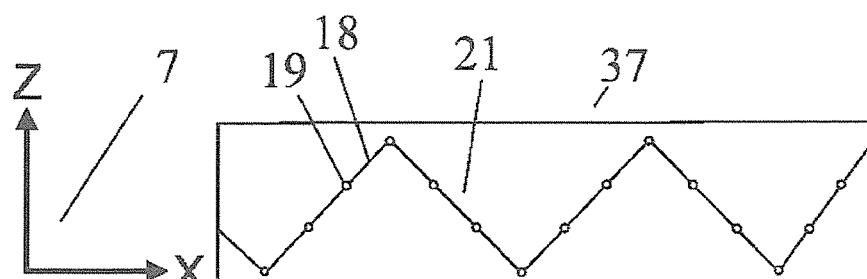
FIG. 26: Elevation view of zigzag path in a non-horizontal generally planar surface.
Figure 27:
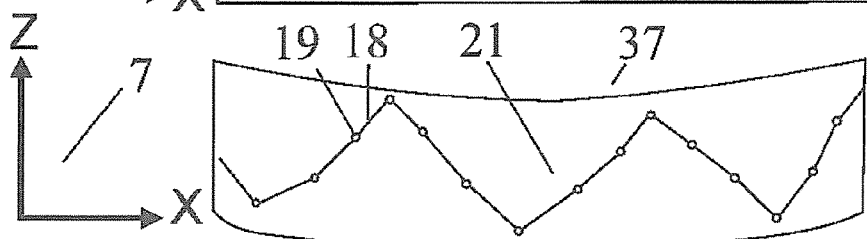
FIG. 27: Elevation view of zigzag path and surface of FIG. 26 after deformation within the vertical plane.
Figure 29:
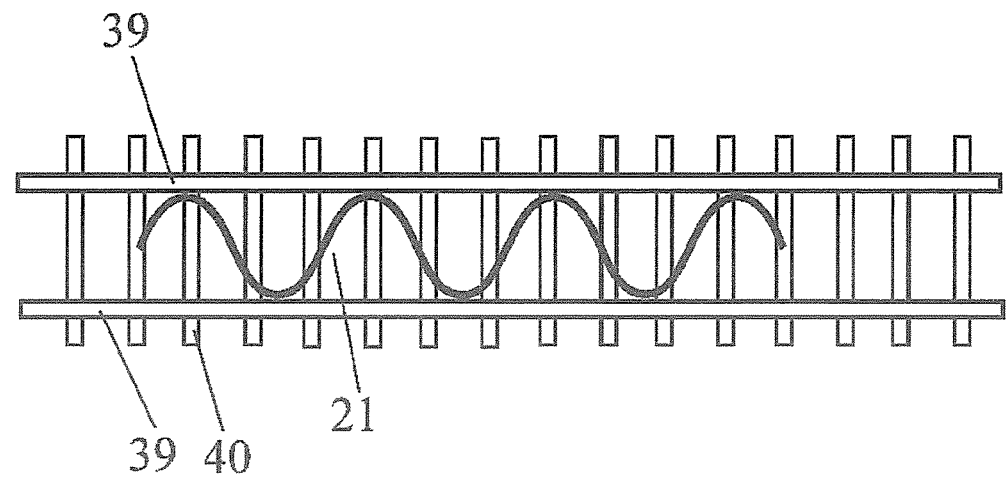
FIG. 29: Sinuated path on railway.

FIG. 26, an elevation view, shows another example of a cyclical array whose path 21 is within a vertical planar surface 37. It is shown zigzagged, but could as well be sinuated. The line segments 18 represent rigid bodies. Circles 19 represent joints. In this case the example is of the plane of the cyclical array being in a filled-in ditch near the toe (lowest elevation) of a slope. The plane lies in XZ, as shown by the axes 7. Subsidence of the toe soil could cause bending within the plane as shown in FIG. 27, another elevation view, wherein 18, 19, 21, and 37 are the same objects as in FIG. 26. This would be sensed by the cyclical array. Movement of the slope as in a landslide could cause arcuate deformation of the vertical plane 37 out of its plane, as shown in FIG. 29, a plan view as shown by the XY axes 7. This lateral bending of the path 21 and the surface 37 (coincident in this view) would also be sensed.

Figure 28:
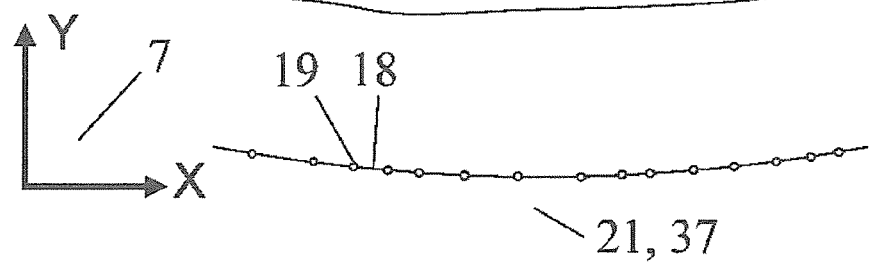
FIG. 28: Plan view of zigzag path and surface of FIG. 26 after deformation within the horizontal plane.

A cyclical array sinuated or zigzagged in a vertical plane can be thought of as a collection of individual subarrays, each with some segments (rigid bodies) sufficiently non-horizontal to make a 3D measurement of position along its length. Each subarray provides a positional reference at its ends, to any adjacent, physically connected subarray. Thus, position is known along the entire cyclical array. In the example in FIG. 28, all legs of the zigzag (for example, one leg is comprised of the second through fourth segments 18 from the left of the figure) become curved, and are sufficiently non-horizontal to provide accurate 3D data.

In general, any segments not sufficiently vertical to provide 3D data for position will provide 2D data for position (from tilt within a vertical plane). Thus, 3D shape data may be imperfect, but still useful.

The shape of the cyclical array will change with any change in the position of one of its parts. The wavelengths of the spatial frequency components of the shape of the cyclical array provide additional information on the 3D shape of the cyclical array, which can be used to improve the above imperfectly-known 3D shape data. For instance, if a sinuation in a vertical plane is undergoing a lateral bulge as in FIG. 28, its wavelengths will be increasing, as represented by increasingly horizontal tilts for all its segments. Thus, any minority portion of near-horizontal segments that are moving toward horizontal along with the more non-horizontal segments, can be assumed with reasonable certainty, to be corroborating the same pattern of movement. Note that wavelength alone is not sufficient to determine direction of movement, because the same wavelength can occur for a bulge to the right of a line or to the left. However, wavelength along with some additional 3D data from non-horizontal segments, can resolve the direction.

A cyclical array sinuated or zigzagged in a horizontal plane also is useful. For example, a cyclical array 21 sinuated between rails of a railway as in FIG. 29 can be used to measure cant and twist of the rails 39, as well as sag and rise. The cyclical array can be attached to the ties 40 between the rails. In a similar way, a cyclical array sinuated on the surface of soil can be used to measure the vertical subsidence (positive and negative) of the entire surface, rather than the subsidence along a line. The sinuated array itself can be considered to fit into the "2DOF" bend case of the claims, or the combination of sinuated array with the tracks to be a case of the "1DOF bend/1DOF twist" case of the claims (the "ribbon" case).

Configurations with the sinuated path in a horizontal plane may be measured with 1DOF tilt sensors in the rigid bodies. When the cyclical array has joints permitting 2DOF bend and no twist, such sensors should preferably be oriented to be at their most sensitive orientation when horizontal. When the cyclical array is on a ribbon (discussed in more detail below) with joints permitting 1DOF bend and 1DOF twist, this is also the ideal arrangement, but measurements will also be quite useful if two sensors are used and the sensors are at 45 degrees to the axis of the ribbon. This can enable use of a standard configuration of sensors on ribbons for various purposes, including horizontal planes on railbeds. Data from the ribbon form with 1DOF sensors must be treated with some care, as sensors near the lateral center of the railbed will not respond to twist of the ribbon, expected when the tracks bend. They would still respond to cant or twist of the tracks. However, sensors near the rails, where twist is not present due to the bend of the ribbon near the rails, will measure tilts due to bend of the tracks, so useful measurements are available for all cases of cyclical arrays in horizontal planes, even with 1DOF sensing. In this case, the sensors near the lateral center of the trackbed measure mainly cant and twist of the rails, and sensors near the rails measure mainly rise and fall (bend in a vertical plane) of the rails.

Other advantages of the invention on railway tracks or other horizontal surfaces include extensibility, which enables, for example, moving with the tracks as the tracks change length due to temperature changes. Another advantage is measurement of 3D shape using sensors for as few as a single degree of freedom.

Figure 30:
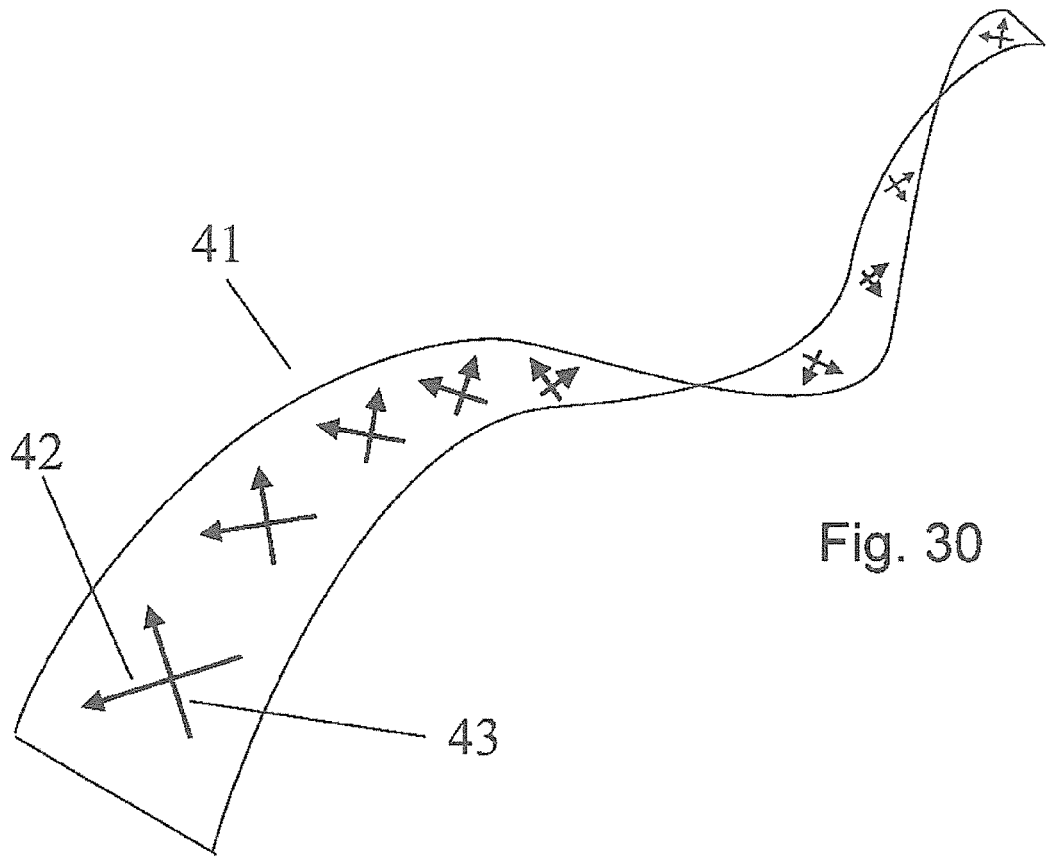
FIG. 30: 3D view of sensors on a ribbon.

FIG. 30 shows a cyclical array of rigid bodies on a ribbon 41, able to bend in 1DOF and twist in 1DOF. Rigid bodies containing tilt sensors are represented by crossed arrows (portraying the axes 42 and 43 of tilt sensors mounted in the rigid bodies) at intervals along the ribbon. Not shown are the rigid bodies, which can be adjusted in size from the size of the integrated circuits containing MEMS accelerometers, to any size of length allowing sufficient bend and twist between rigid bodies. Spacing is further assumed to be such that the flexible portions between rigid bodies have constant curvature in both bend and twist over the angular range of measurements of importance. In general, the shorter (axially) the rigid bodies, the greater the number of sensors required.

The axes 42 and 43 of sensors are shown as orthogonal, although this is not strictly necessary. They need only be non-co-linear. The orthogonal axes 42 and 43 are shown to be oriented at 45 degrees to the long axis of the ribbon. This leads to the fewest cases of the sensors operating far from their optimum angular range. MEMS accelerometers contain masses on spring suspensions that can be thought of as deflecting along a line. Deflection is according to the cosine of the angle of the line with gravity. The sensor output thus changes most vigorously when the angle is 90 degrees, is reduced by only 30 percent when the angle is 45 degrees, and falls off very rapidly below 30 degrees. Thus, if the ribbon is in a vertical plane with the sensors at 45 degrees as shown, reasonable response is obtained from both sensors when the ribbon's long axis is vertical or horizontal. When the ribbon is in a horizontal plane, both sensors of a pair are optimally oriented for most vigorous output. Contrast this with a case where one sensor of an orthogonal pair is aligned with the axis of the ribbon. When vertical in a vertical plane, tilts out of the plane would be poorly sensed because the only sensor responding would be the one with a vertical axis, and it would be at the most unresponsive part of its cosine response curve. The 45 degree mounting is the best compromise, but many other angles would work over wide ranges. In some situations, another sensor with a third axis orthogonal to the first two can be used. In such situations, normally a triaxial MEMS accelerometer would be used.

Figure 31:
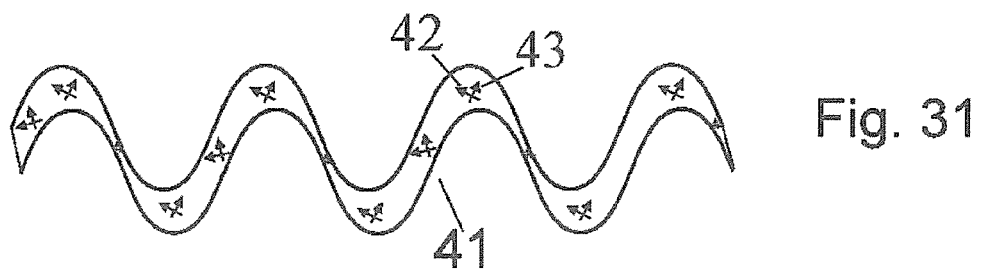
FIG. 31: Above-edge-on 3D view of sensors on a sinuated ribbon.

FIG. 31 shows the ribbon 41 of FIG. 30 sinuated in a vertical plane, viewed from somewhat above edge-on to the ribbon. The axes of the sensors in the rigid bodies are shown as crossed arrows 42 and 43 and together represent the rigid body itself, as described for FIG. 30. The configuration of FIG. 31 can make many of the measurements already discussed for sinuated or zigzagged sensors. For instance, it could perform in one of the most general cases: a sinuated path cyclically surrounding a helical medial axis in a tunnel surface, the helical medial axis in turn cyclically surrounding another medial axis following the central axis of the tunnel.

Figure 32:
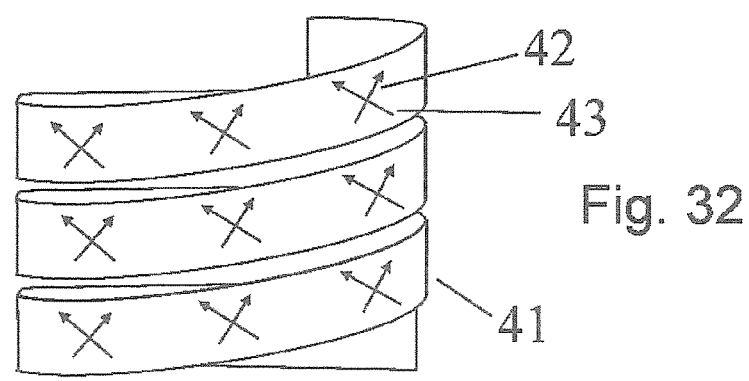
FIG. 32: Elevation view of sensors on a ribbon, ribbon in a helical shape.

FIG. 32 shows the ribbon 41 of FIG. 30 in a helical form. Objects in FIG. 32 are the same as those in FIG. 30. This cyclical array will sense extension and compression of the helix along the central axis of the helix, as well as transverse (lateral) deformation of the helix. Extension or compression will lead to changes in bend and twist of the ribbon. Lateral deformation will cause other bends and twists. The bends and twists completely define the path of the cyclical array, because they completely define the degrees of freedom permitted.

The principle in all cases of measurement of the cyclical arrays is that all possible allowed degrees of freedom are measured by the tilt sensors within the range of desired measurements, so that the shape of the path is known. The shape of the path is used to calculate the surface containing the path and to calculate the shape of the medial axis. The medial axis is used to simplify the interpretation of results, usually to provide data comparable with straight-line sensor paths.

Figure 33:
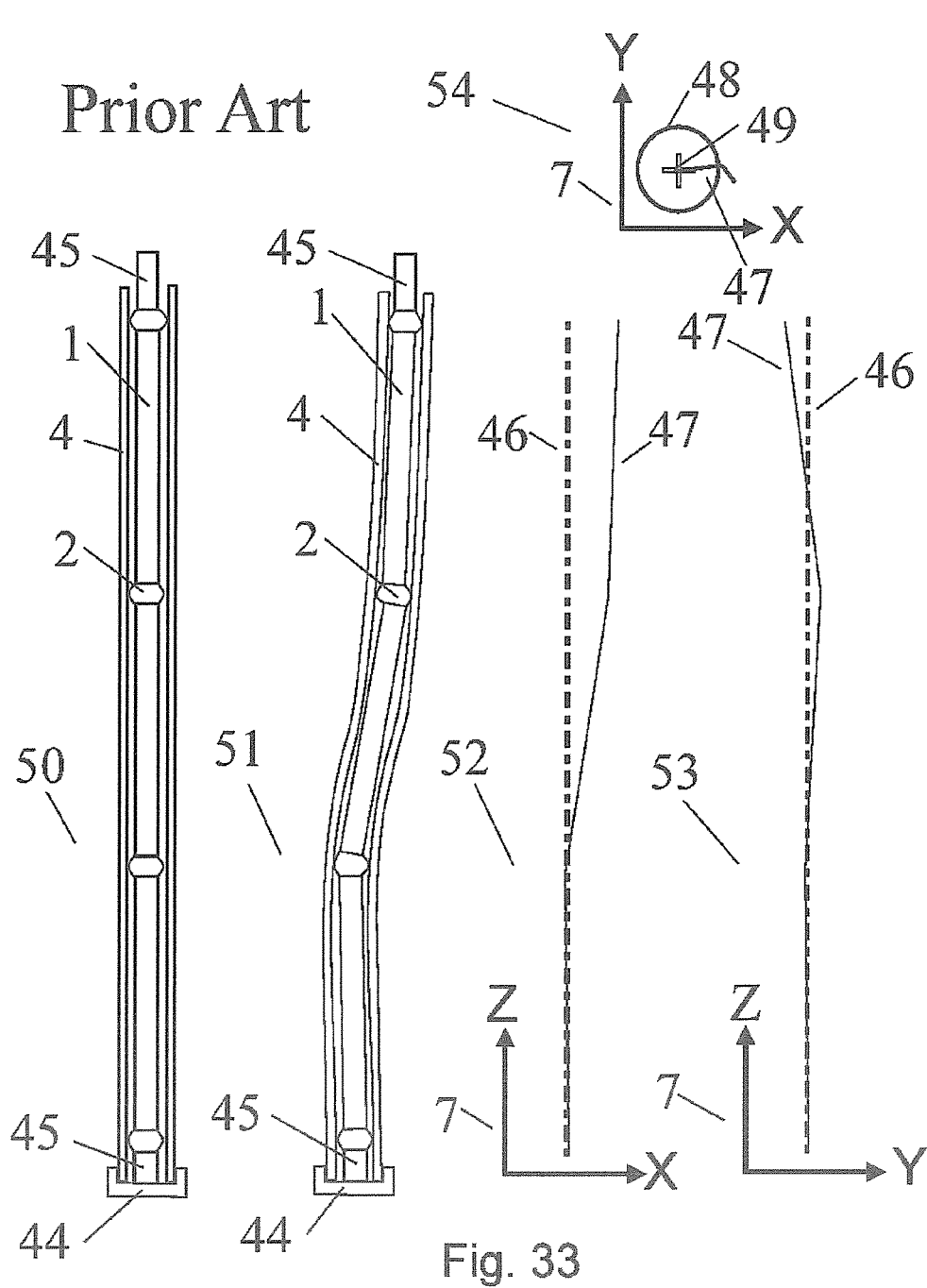
FIG. 33: Elevation views of prior-art SAA in casing, straight and deformed, and three graphs of data from three orthogonal views.

FIG. 33 shows a prior-art installation of SAA within a vertical casing 4 in a borehole (not shown). The casing is held secure within the borehole by grout (not shown). The SAA is comprised of rigid bodies 1 in the form of tubes, connected by joints 2, which can bend in 2DOF but not twist. Shorter rigid bodies 45 in FIG. 33 denote a continuation of the SAA for visual effect and can be assumed to be unmoving. The casing has a cap 44 at the bottom. This provides a reaction to axial forces applied from above, and keeps materials (e.g. water and mud) out of the casing.

An axial force has been applied to the SAA, causing the joints to swell and hold it snug within the casing. A first view 51 shows an XZ elevation of the SAA and casing before any deformation. A second XZ elevation view 52 shows the system after the soil has deformed laterally. Two graphs 52 and 53 of deformation data are shown. 52 is the XZ view, 53 is the YZ view. The dashed line 46 in each graph shows the shape of the SAA at a first time. The solid line 47 in each graph shows the deformation at a second time. Graph 54 is an XY view of the deformation. The "+" mark 49 locates the axis of the SAA before deformation. The circle 48 represents the inside diameter of the unmoving bottom portion of the casing. The solid line 47 in Graph 54 is a top-down plan view of the solid lines shown in the XZ and YZ views, 52 and 53 respectively. Axes 7 in Graphs 52, 53, and 54 indicate the coordinates of each view: XZ, YZ, and XY respectively.

Figure 34:
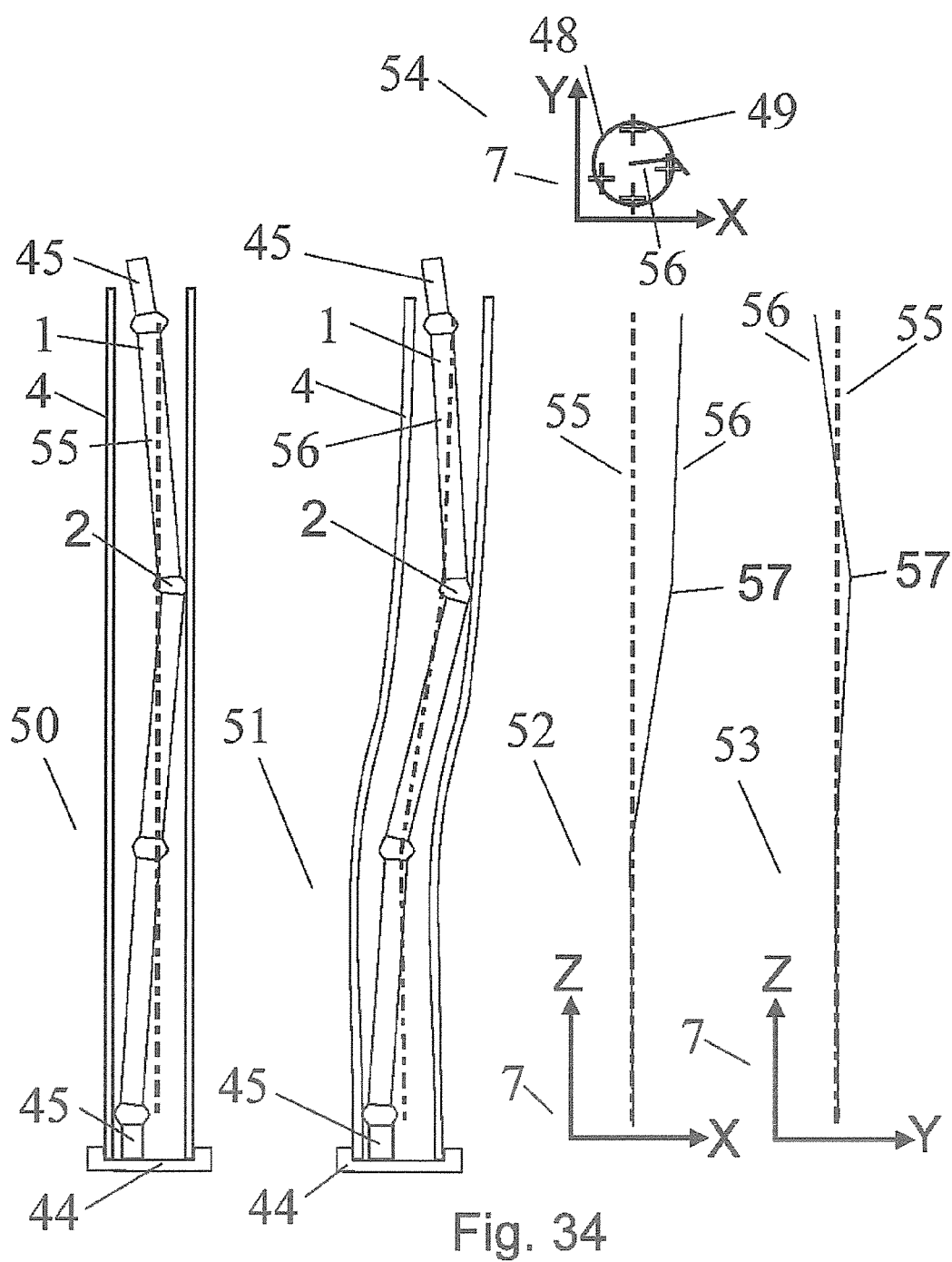
FIG. 34: Elevation views of non-straight sensor array in casing, casing straight and deformed, and three graphs of data from three orthogonal views, including portrayal of medial axis.

FIG. 34 is a portrayal of an SAA in a helical path in a vertical casing 4 larger than in FIG. 33. Otherwise, the configuration is the same as FIG. 33 (i.e. the casing is in a borehole, secured with grout, and the deformations applied to the casing are the same). The SAA is comprised of rigid bodies 1 in the form of tubes, connected by joints 2, which can bend in 2DOF but not twist. Views 50 and 51 are the same XZ elevation view of the un-deformed casing and the deformed casing, respectively. Graph 54, the XY view, shows "+" signs 49 for the center line of the SAA near the contact points of the SAA with the casing, as it cycles about a central axis from bottom to top of casing. The solid line 56 in the XY view represents the medial axis in this "top-down" view. Graphs 52 and 53 are the XZ and YZ views showing data identical to that of the "straight" SAA in FIG. 33. But in this case, the data are not from the center of the SAA, but from medial axis data. In views 50-53, the data are shown from the undeformed and the deformed helix, by medial axes 55 and 56 respectively. The medial axes of the helix, 55 and 56, can be found by either of the algorithms given previously, with second vertices 57 on the medial axis projected from the first vertices 2 of the SAA. (For simplicity, only one vertex 57 in views 52 and 53 is shown, but every vertex of the polyline 55 or 56 would have been so projected). All other labelled objects are the same as in FIG. 33.

A cyclical array comprised of rigid bodies separated by joints that bend in 2DOF will, for a range of stiffness and length of joints, automatically take on a helical shape within a cylindrical casing (or uncased borehole), when axial compression is applied, such as by gravity in a vertical casing or by spring force in a horizontal casing. When such a cyclical array is lowered into a vertical casing, the low end will strike the bottom cap of the casing, or the bottom of the borehole, and the lowest rigid body will tilt. The next rigid body will tilt, but will tend to force the vertex at the top of the first rigid body to travel around the circumference of the casing. This rotation happens for every rigid body as it "falls into place". Consider two rigid bodies separated by a 2DOF joint at the bottom of a casing. Under very low axial force, the two bodies could come to rest in a plane, bisecting the casing. However additional force can easily upset this form and turn it into a helix. A planar shape can only be maintained if there is little force and high friction between joints and the casing. With low friction and high force, the planar shape is unstable, there being nothing but friction to keep the middle vertex from sliding around the circumference.

The formation of a helix can be clockwise or counter-clockwise. Addition of a slight torsional moment to the helix as it first forms is sufficient to drive it to one of the two states. Either state can provide the same medial axis and measurements of shape and deformation of shape. Once it begins to form from the bottom toward the top of a casing with a particular state, a helix formed by a cyclical array with segment lengths, joint lengths, and joint stiffness within a desirable range, the helix cannot reverse to the other state Once the helix forms, it is secured into place by outward expansion forces that are a consequence of the helix equations. The diameter of the casing (or borehole) must be sufficient for the forces to overcome friction and the stiffness of the joints, but helixes can form easily with only 20% more diameter of the casing than the rigid bodies. This extra room can be reduced if friction and stiffness are reduced.

The principles of helix formation are the same whether the rigid bodies are long, or very short. If very short, the cyclical array will be in almost constant contact with the walls of the casing or borehole.

The following conditions are conducive to the formation of helixes that do not reverse state from clockwise to counter-clockwise or vice versa:
1. Segments within an overall containment of tubing resistant to twist, and unable to form an S curve within the distance of a joint, such as hydraulic hose.
2. Segments with short, flexible joints, the joints sufficiently short that they do not form S-shaped curves.
3. Segments within an overall containment that is resistant to twist and sufficiently stiff in bending to maintain constant bend and twist along its length regardless of the mechanical properties of the array contained within.

An example of the first case is 28 cm segments contained within hydraulic hose with an inside diameter of approximately 19 mm, the segments separated axially by approximately 20 mm.

An example of the second case is 30 or 50 cm segments separated by short joints made of hydraulic hose with an outer diameter of approximately 15 mm, the length of the joints being approximately 25 mm.

An example of the third case is 30 or 50 cm segments separated by short or long joints of arbitrary construction, held within a containment of PVC tube with 21 mm inside diameter and approximately 27 mm outside diameter.

A construction according to the third case is an easy and reliable method of forming a helix with either clockwise or counter-clockwise direction, containing a wide variety of array constructions. The PVC has stiffness sufficient to override that of the array within, but sufficiently flexible to form a helix with no more than 20 kgf force applied axially.

The addition of a containing tube, sufficiently small in diameter to allow use within a practical borehole diameter, can be exploited to make the formation of a particular cyclical shape, such as a helix or sinuation, predictable for a wide variety of array constructions. The containing tube surrounds the sensor array.

The sensor array may be held immobilized within the containing tube by means of prior-art swelling joints and/or the addition of axial force, including that of gravity, to impart to the array a cyclical shape, that, depending on joint and segment sizes and joint stiffness in bending, may be zigzag, helical, or random in azimuth, but will have the vertices in intimate contact with the inner wall of the containing tube. This is an example of a "nested" cyclicity, whereby the sensor array has a medial axis within its containing tube, and that medial axis, in the shape of a helix or other cyclical shape within the containing borehole, defines an overall medial axis of the borehole.

A helical arrangement of rigid bodies with tilt sensors allows for correcting twist errors arising from damaged joints that have been torqued beyond their elastic limits. Any such joints will lead to an incorrect roll angle of a rigid body in a helix with a vertical axis, where the roll angle is the inverse tangent of the ratio of the static X and Y accelerations read by the sensors in the rigid body responsible for reporting the 2DOF of tilt of the top of the rigid body relative to the bottom. The same two X and Y sensors will also provide a measure the roll angle if the helix is mainly horizontal. In both vertical and horizontal cases the helix must have a regular progression of roll angles because of being mounted in a uniform-diameter tube that is generally straight. Such a helix will have a set of predictable and constant roll angles and other tilts. Data from sensors beyond (in the order of calculation of the helix) and including the defective joint can be corrected by applying an offset equal to the negative of the twist error. A similar technique can be used if the sensor array is mounted in any surface in a known shape. In all cases, there must be some tilt of the rigid body that is to be corrected, or X and Y accelerations will be equal regardless of any twist.

Sensor arrays that do not form a helix may still cyclically surround a medial axis. Cases include:
1. The helix reverses direction from counter-clockwise to clockwise or vice versa at regular or irregular intervals, due to stiffness and length of joints and segments.
2. The array takes on a zigzag shape within a vertical plane within the borehole, with adjacent vertices on opposite sides of the borehole.
3. The vertices come to rest on the walls of the borehole at random or highly-variable azimuths.
4. One or more segments lie flat against the wall of the borehole.

In all the above cases, a medial axis may be found that represents the shape of the borehole. It is also possible to perform corrections of at least many twist errors, based on the knowledge that vertices may not occupy space outside the borehole. Even if the positions of the vertices shift over time (such as by a segment that was flat against the borehole wall moving so that its vertices are on opposite sides of the borehole), the medial axis will still represent the shape of the borehole.

Figures 35, 36:
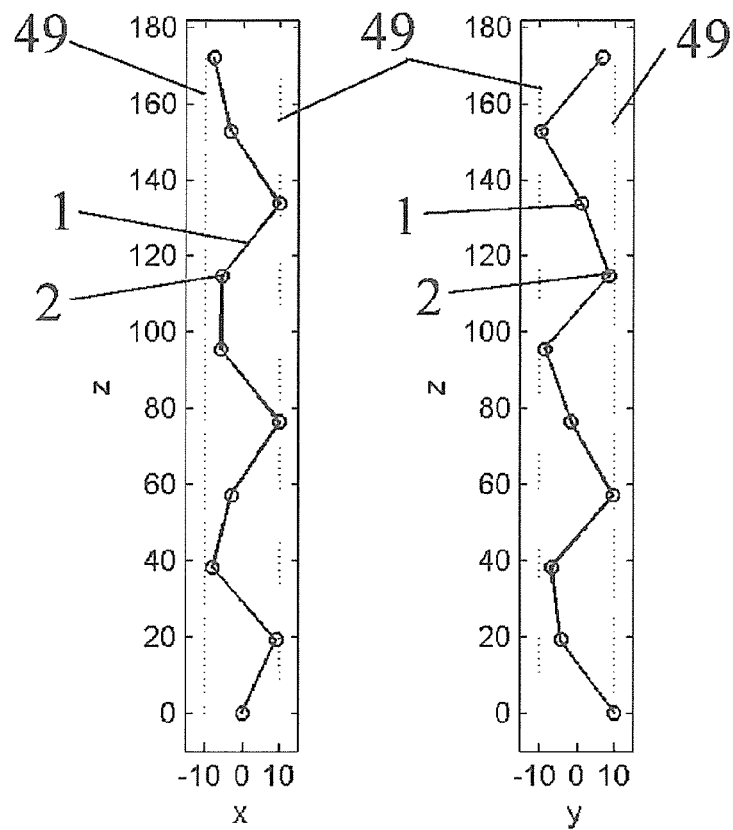
FIG. 35: Graph of generally helical segmented sensor array in casing, showing XZ data.
FIG. 36: Graph of generally helical segmented sensor array of FIG. 35, in casing, showing YZ data.
Figure 37:
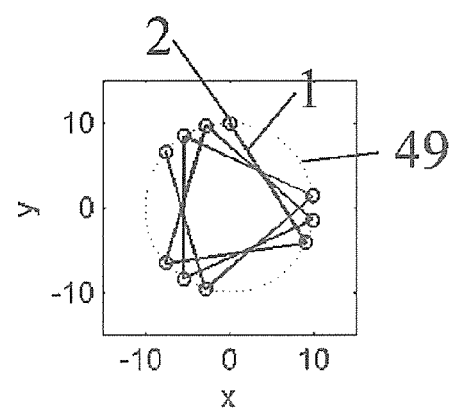
FIG. 37: Graph of generally helical segmented sensor array of FIG. 35, in casing, showing XY data.

FIGS. 35-37 show XZ, YZ, and XY views of the path of a cyclical array with line segments 1 denoting long rigid bodies, separated by joints (circles, 2) that are torsionally stiff. The dotted lines 49 show the inside diameter of a borehole or casing bounding the cyclical array. In the XY view of FIG. 37, the dotted circle is taken to be at the unmoving bottom of the casing. It can be seen that although each of the elevation views (FIGS. 35 and 36) looks "irregular", the joints are secured to the casing (or borehole) by lateral expansive forces at regular azimuthal intervals around the casing, as can be seen in the plan view in FIG. 37. An algorithm can be applied to each view to find a first, second, or more medial axes to converge onto a final medial axis that in this case would be the centerline of the casing. Alternatively, the Fourier components of the spatial waveform in each view could be found and medial axes found for all of them (no iteration required), and combined into a final medial axis. Both types of algorithm have been explained in detail earlier in this description.

Figure 38:
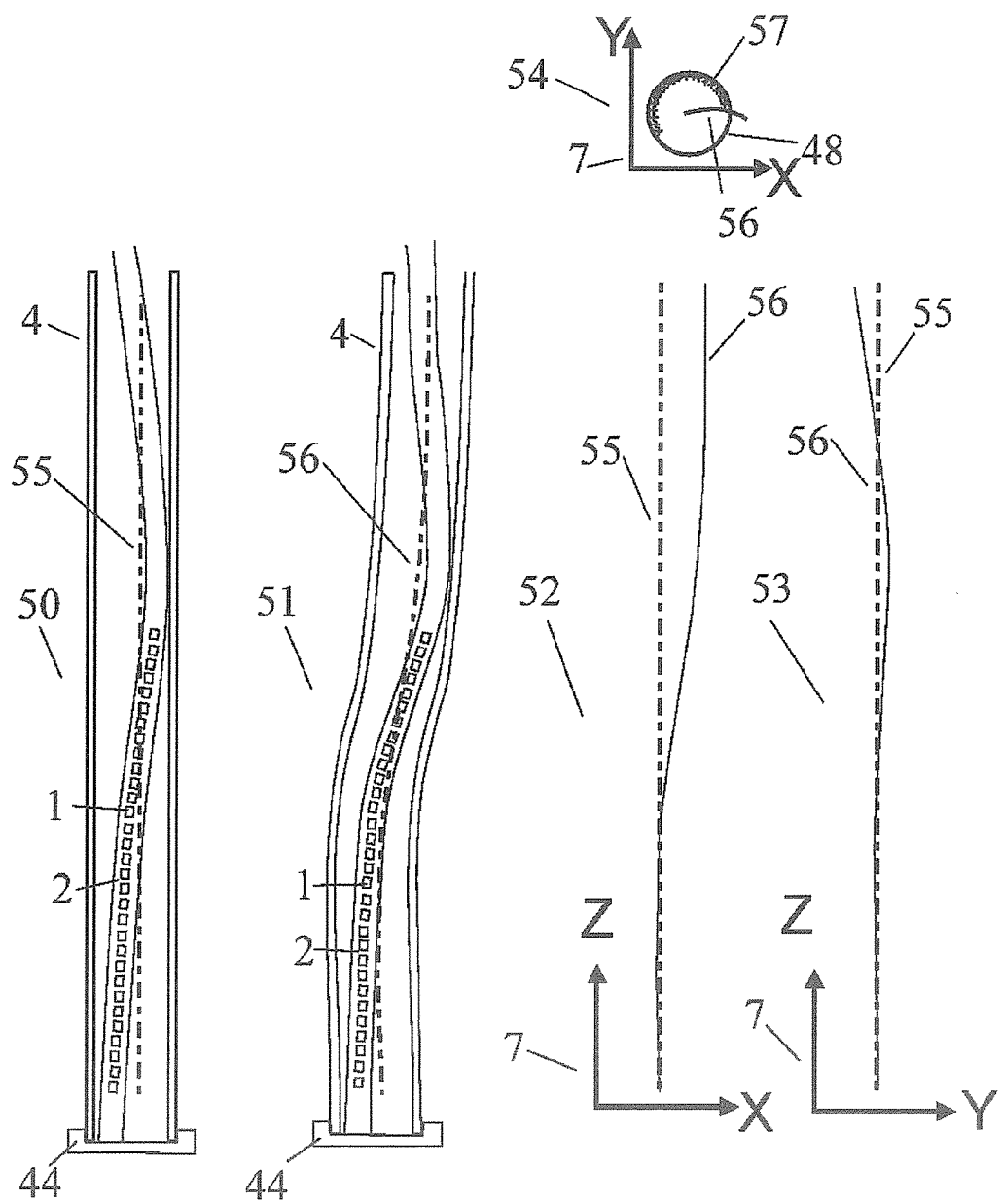
FIG. 38: Elevation views of helical non-straight sensor array in casing, with close spacing of sensors and smooth curves, casing straight and deformed, and three graphs of data from three orthogonal views, including portrayal of medial axis.

As another example of a helical array, FIG. 38, views 50 and 51 show the undeformed and deformed states, respectively, of the same XZ elevation of a cyclical array with many more rigid bodies than in the previous helical example of FIG. 34. The rigid bodies 1 are portrayed as small rectangles. Physically, they could be short tubes fitted with sensors, held tightly in hydraulic hose to form the joints. The joints 2, between each pair of rigid bodies, are formed in this example from the hydraulic hose extending from rigid body to rigid body. The cyclical array forms a nearly smooth helical curve within the casing 4 (which could as well be an uncased borehole). In this example, the casing is fitted with an end cap 44. It provides reaction to axial forces applied from above, and keeps water and soil out of the casing.

Data from the medial axis of the cyclical array are shown in views 50-53 as dashed lines 55 and 56, corresponding to the undeformed and deformed states respectively. The medial axes are similar to that of the previous example of FIG. 34, but the greater number of data points creates smoother curves. It may be possible to reduce the number of rigid bodies having sensors, if the stiffness of the cyclical array joints is sufficient to maintain a generally helical shape between bodies with sensors. For simplicity, rigid bodies are not shown in the upper part of views 50 and 51, but the data are shown as if the rigid bodies are present.

For any of the non-straight arrays described herein, it may be possible to populate only some ("a set") of the rigid bodies with sensors, the other rigid bodies not being populated with sensors. There is always the risk that the unpopulated ("unsensorized") rigid bodies will tilt due to a local detail of shape of the medium containing the array, and this detail will be missed. But there are useful cases where only a set of the rigid bodies are populated with sensors, and the geometry, or particularly the bending stiffness of the casing holding the array is sufficient to filter out such local disturbances, and capture the overall shape with fidelity. Stiff casing can be thought of as a filter for spatial frequency components of shape, passing through to the rigid bodies only the low-spatial-frequency components. A helical shape of the array and/or its flexible joints, can contribute to this spatial filtering, due to increased stiffness due to curves with constant bend and twist.

In FIG. 38, graphs 52 and 53 are XZ and YZ views of the data. Graph 54 is the XY view. "+" marks 57 show the locations of rigid body centers as the helical array ascends from bottom to top of the casing. The solid line 56 is the top-down view of medial axis 56, now smoother than in FIG. 34. As in similar figures, Axes 7 label the coordinates in views 52-54.

Figure 39:
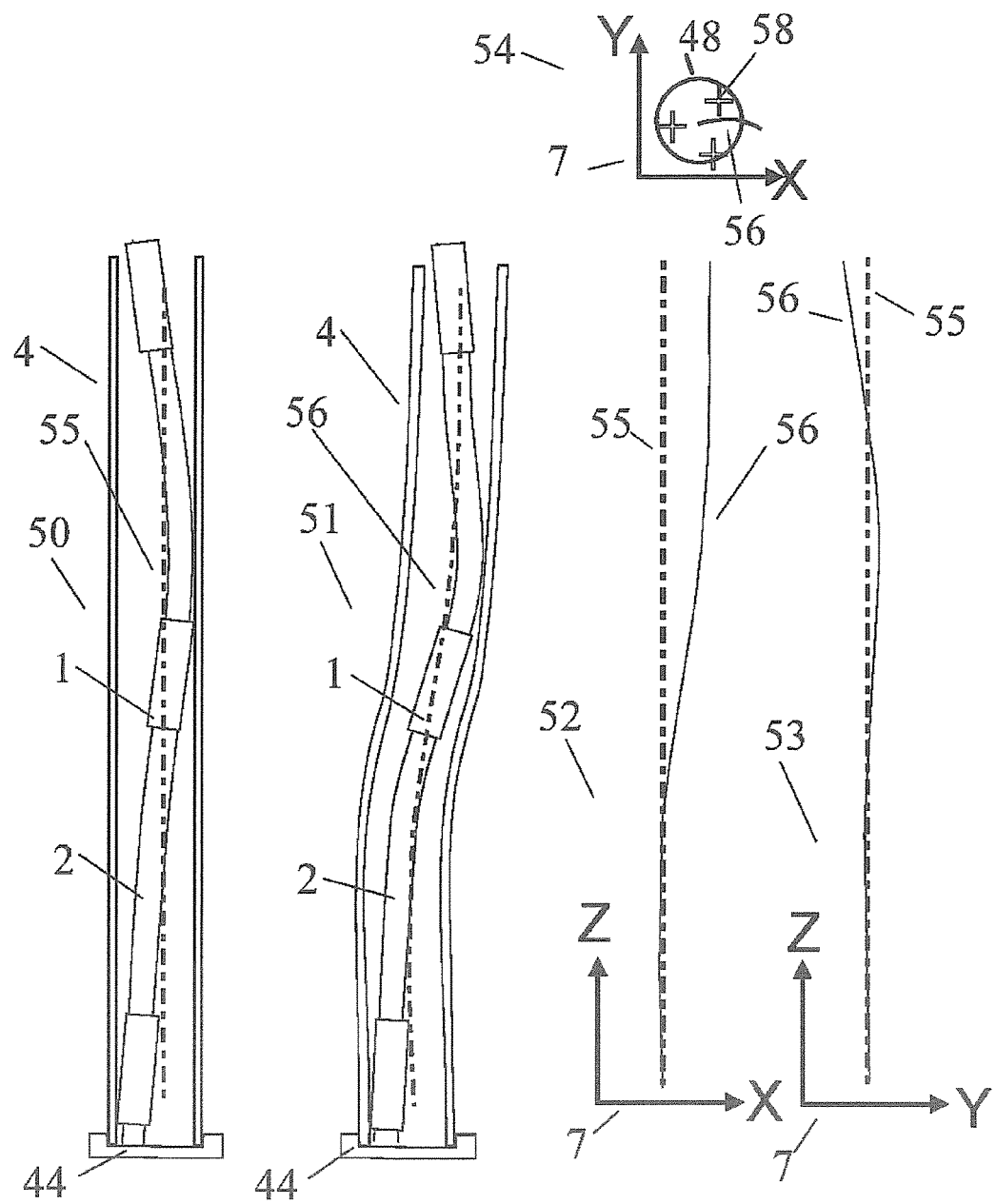
FIG. 39: Elevation views of non-straight sensor array in casing, with long joints, casing straight and deformed, and three graphs of data from three orthogonal views, including portrayal of medial axis.

FIG. 39 shows a cyclical array with widely-spaced rigid bodies 1, separated by long joints 2 made of hydraulic hose. The rigid bodies could be rigid pipes or tubes. The spacings and stiffnesses are such that the joint material and rigid bodies form a nearly smooth helix in almost constant contact with the casing. Views 50 and 51 are elevations of the same XZ view of the cyclical array. Views 52-54 are XZ, YZ, and XY views. Plus marks 58 in view 54 are the locations of the centers of the rigid bodies as the helix climbs from bottom to top of the casing. Axes 7 indicate the coordinates of each of views 52-54. Circle 48 in view 54 indicates the inner circumference of the casing at the unmoving bottom, where the end cap 44 is located.

As an illustration, in FIG. 39 the medial axes 55 and 56 in all the views have been calculated by using the tilts from the widely-spaced rigid bodies as in other examples, but in this case using them as samples of tilt along a continuous smooth helical space curve. This results in a continuous medial axis, rather than a polyline medial axis. To implement this means of determining a medial axis, the samples of tilt would be used as control points along a 3D spline-fit space curve. The spline-fit curve would then be used to calculate a medial axis at any desired spatial resolution. The result is very similar to the medial axis of FIG. 38. Naturally, with long joints, there is more opportunity for a localized deformation between rigid bodies to be missed, or partially missed.

FIG. 40 shows a construction similar to that of FIG. 39 above with even longer spacing between rigid bodies 1. The joint 2 between the rigid bodies is made of hydraulic hose to resist twist and to bend in 2DOF. The hose and the rigid bodies form a helix. The flexible joint, even though long, maintains constant curvature and twist, as dictated by the helix equations. The joint is sufficiently long that this is a case of "sampling" tilt along the length of the cyclical array, to an extent even greater than that of the cyclical array in FIG. 39. But so long as the changes in shape are not abrupt, this is a useful method of monitoring shape and deformation of shape. The cyclical array is in a casing 4, with bottom cap 44.

FIG. 41 shows a construction similar to that of FIG. 40 above and also has long spacing between rigid bodies. The rigid bodies are designed to fit tightly in the casing, unlike those of FIG. 40, which are pressed against the inner surface of the casing at their ends, but do not fit tightly all around the circumference. The long joint is helical over most of its length and maintains nearly constant contact with the casing, and nearly constant bend and twist. The bend moments of the helix are transferred to the rigid body, which, if there is a gap between the rigid body and the casing, will lock the rigid body to set a constant angular offset between rigid body and casing, thus effectively locking it in place.

Figures 42, 43:
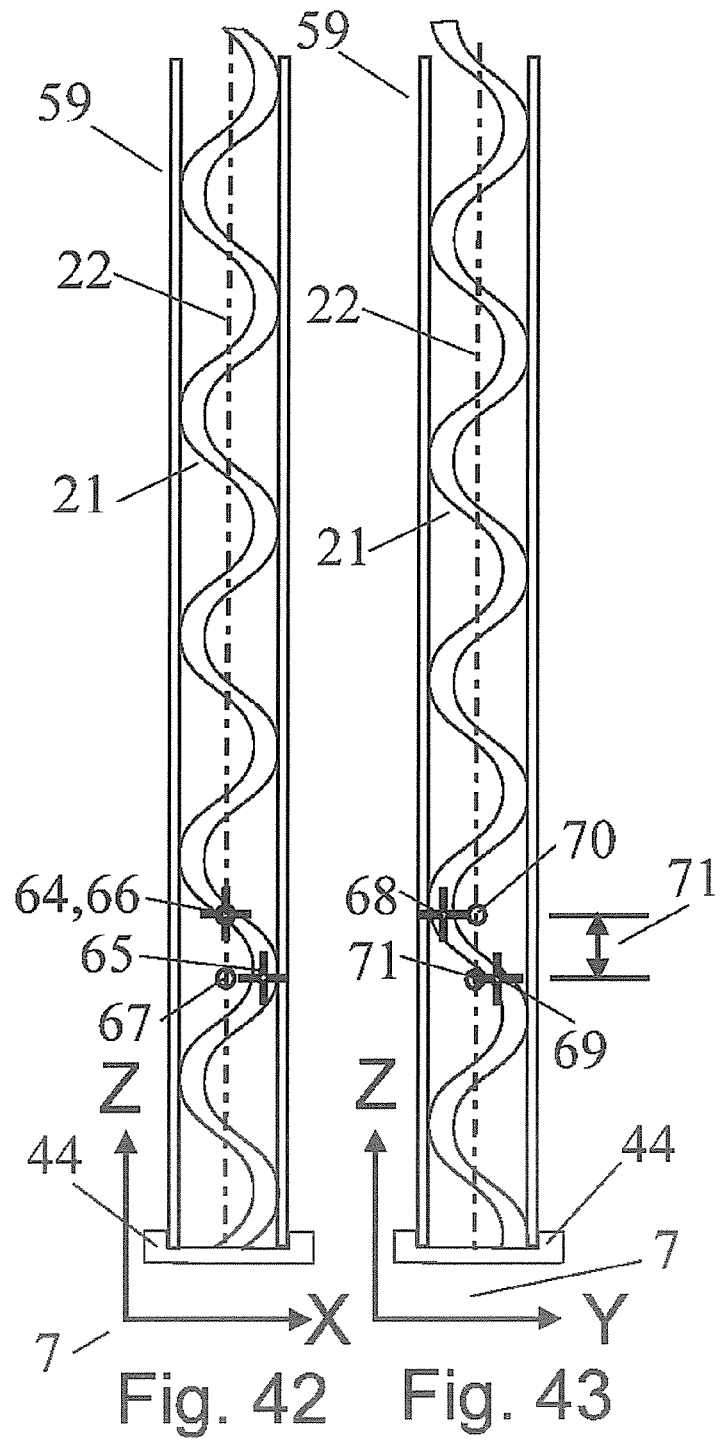
FIGS. 42-44: Elevation views of sensor array in helical path, medial axis, first vertices on helical path, and second vertices on medial axis, showing diminution of vertex spacing in FIG. 44 when casing is larger.
Figure 44:
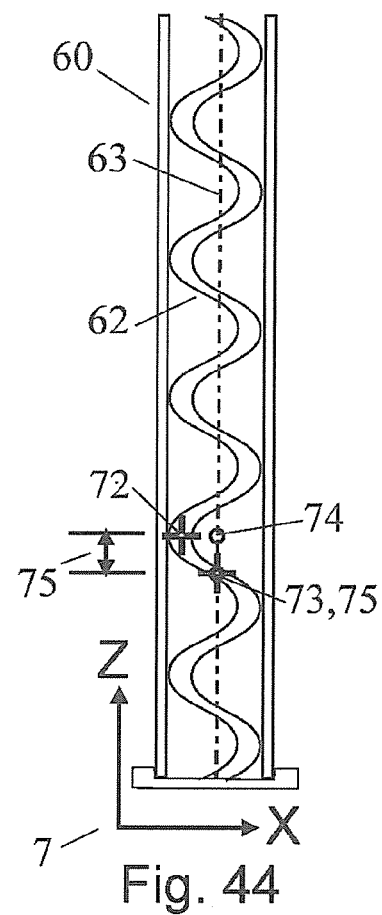

FIGS. 42 and 43 show XZ and YZ views of a cyclical array in the shape of a first helix 21 with a first wavelength in each view; the helix is in a casing (or an uncased borehole) 59, with a first diameter. The helix has a medial axis 22. FIG. 44 shows an XZ view of the same cyclical array in a second helix 62 in a larger-diameter casing or borehole 60. The larger diameter of the casing 60 has resulted in a second, shorter wavelength in XZ or YZ views (for simplicity, only one view, XZ, is shown for the second helix). The second helix will have a shorter spacing of "first vertices" on the sinuated path in the vertical dimension, and a shorter spacing of "second vertices" along the vertical extent of the medial axis 63.

Example vertices are shown on the helix and the medial axis of each view. In FIG. 42, the XZ view, first vertices 64 and 65 are shown as plus marks at a 90 degree spacing on the helix. The circle marks 66 and 67 on the medial axis 22 are second vertices corresponding to first vertices 64 and 65 on the helix, respectively. Circle mark 66 is coincident in the view with plus mark 64. In FIG. 43, plus marks 68 and 69, and circle marks 70 and 71 are companions to the marks in FIG. 42, but in the YZ view. The marks have a first vertical spacing 71.

In FIG. 44, the XZ view of the same cyclical array in a larger casing, plus marks 72 and 73 are first vertices, and circle marks 74 and 75 are second vertices. Marks 73 and 75 are coincident. Spacing of the marks is 90 degrees on the larger-diameter helical shape. Vertical spacing 75 is less than vertical spacing 71.

Figure 45:
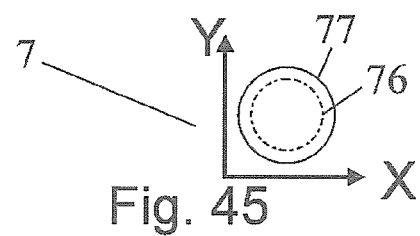
FIG. 45: Plan view of the inner surfaces of the casings of FIGS. 42-43, and FIG. 44.

FIG. 45, the XY view, shows the inside circumference 76 of the first casing, and the larger circumference 77 of the second casing. Axes 7 in each view indicate the coordinates of each view.

FIGS. 42-45 illustrate that by choosing different casing sizes during installation, it is possible to distribute the sensors in the same cyclical array at different spacings along the casing. The sizing of the casing also controls pitch of the helix, which is a means of adjusting fit of the cyclical array in the casing or adjusting the helical strain ratio to match the Poisson's ratio of the soil in an uncased borehole.

When the cyclical sensor array is in helical form in a casing or borehole, there is empty space that provides a buffer against crushing or other damage from external forces. The external forces may somewhat distort the measurement if they move the array locally, but in general it will survive longer as the crushing progresses, and will remain extractable longer than would a tightly-fitting array where there would be little or no empty space available. There is also empty space in inclinometer installations, but the grooves holding the wheels of the inclinometers will be the first element to be distorted by external forces, which usually renders the inclinometer installation useless in short order.

Figure 46:
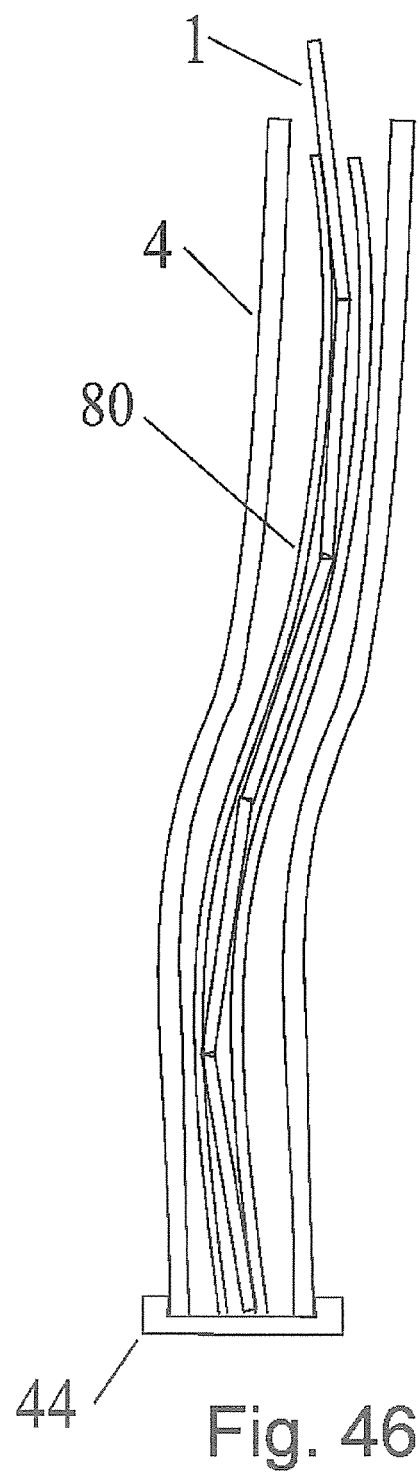
FIG. 46: Elevation view of sensor array in cyclical path within a containing tube, the tube in another cyclical path within a casing.

FIG. 46 shows segments 1 of a sensor array within a containing tube 80, added to enforce a predictable cyclical shape, due to the increased stiffness in bending of the containing tube compared to the sensor joints (not shown, but understood to join each segment to the next). An axial force may be applied to the containing tube and may include that of gravity, to place the containing tube in a desired cyclical shape such as a helix within and in contact with the casing 4, or within an uncased borehole, and another axial force, which may include gravity, may be applied to the segments, to create another cyclical shape within the containing tube, to immobilize the segments therein by placing the vertices (centers of the joints) in contact with the inner surface of the containing tube. As in other examples, an end cap 44 can be used to keep soil and water out of the casing, and to provide a reaction to the axial forces. The containing tube may also be separately capped (not shown). Segments in FIG. 46 could alternatively be separated by joints of significant length, and all the comments concerning the segments and joints and their forms within casings in earlier examples can be applied to the segments and joints within the containing tube. FIG. 46 is an example of a "nested" set of cyclical paths, one set pertaining to the segments within the containing tube; the other set pertaining to the path of the containing tube within the casing or uncased borehole. A first medial axis (not shown) derived from the vertices of the segments, will have a shape representing the path of the containing tube. A second medial axis (not shown) derived from the path of the first medial axis, will have a shape representing the path of the borehole or its casing.

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The invention claimed is:

1. A non-straight sensor array within a gravity field comprising:
   rigid bodies with known dimensions, separated by joints with known dimensions,
   said joints having flexibility, the flexibility having two degrees of freedom selected from (1) two of bend without twist wherein the joints inherently resist twist, and (2) one of bend and one of twist,
   each of said degrees of freedom being monotonic and constant over the joint length,
   said rigid bodies and joints defining a sensor path comprised of straight line segments intersecting in first vertices,
   said straight line segments having lengths equal to the axial center-to-center distance between adjacent joints when the array is straight,
   said straight line segments at tilts representing tilts of the rigid bodies,
   the sensor path within a surface having at least two dimensions,
   the sensor path cyclically surrounding a medial axis having at least two dimensions, second vertices along the medial axis, representing the positions of first vertices of the sensor path along the medial axis, the sensor path being extensible and compressible along the medial axis without changing a path length of the sensor path, a set of said rigid bodies selected at intervals along said sensor path to represent the shape of said sensor path, said selected set of rigid bodies having gravimetric sensors for measuring tilt of said selected rigid bodies in at least one degree of freedom per selected rigid body in the gravity field, at least one of said selected rigid bodies having a known position and orientation in the World Coordinate System, said array adapted for measuring the at least two-dimensional shape of the surface, the at least two-dimensional shape of the medial axis, and the positions of the second vertices along the medial axis in the World Coordinate System from the orientation of each selected rigid body within the gravity field, wherein said sensor array forms a non-straight path cyclically surrounding the medial axis within said surface, the rigid bodies separated by said flexible joints.

2. The sensor array of claim 1, wherein the path is generally a helix, the surface is a cylindrical surface, the sensor array expanding laterally to fit tightly to the cylindrical surface upon application of axial compression, wherein the helix is axially loaded and wherein intimate contact between the sensor array and the cylindrical surface is maintained and maximized.

3. The sensor array of claim 2, wherein the helix is configured as one or more of the following: the path is within an overall containment of tubing resistant to twist; the joints of the path are sufficiently short for preventing formation of S-shaped curves; the path within an overall containment which is resistant to twist along its length regardless of the mechanical properties of the array contained within.

4. The sensor array of claim 1, wherein the path is sinuated or zig-zagged within the surface, said surface being planar or curved and generally horizontal or non-horizontal.

5. The sensor array of claim 1, wherein said selected set of rigid bodies comprises all the rigid bodies.

6. The sensor array of claim 1, wherein said selected set of rigid bodies have tilts representing the sensor path and tilts of any remaining rigid bodies are redundant to those of selected rigid bodies adjacent to said remaining rigid bodies.

7. The sensor array claim 1, wherein the rigid bodies are attached to a planar flexural ribbon capable of one degree of freedom of bend and one degree of freedom of twist between adjacent rigid bodies and incapable of bend within the plane of the ribbon, wherein the ribbon forms the joints between rigid bodies.

8. The sensor array of claim 1, wherein the surface is a cylindrical surface and the sensor array forms a helix within the cylindrical surface in a medium capable of shear and compression, the cylindrical surface encloses the medial axis, and the medial axis represents the shape of the medium as it is deformed lateral to the medial axis by shearing and axial to the medial axis by compression.

9. The sensor array of claims 8, wherein the helix of the sensor array is in a borehole or tunnel in the medium and the array is in repeated contact with the inner surface of the borehole or tunnel along the length of the array.

10. The sensor array of claim 1, wherein the surface is a cylindrical surface further comprising a containing tube to contain said array, the containing tube adding stiffness in bending, the added stiffness enforcing a predictable shape within a cased or uncased borehole.

11. The sensor array of claim 10, wherein the sensor array follows a cyclical path within said surface, said surface is generally planar, the sensor path includes portions that cross the medial axis and the portions are comprised of more than one non-horizontal rigid body, the rigid bodies providing flexibility of the shape out of its plane.

12. The sensor array of claim 1, wherein the surface is generally planar and the sensor array is in the generally planar surface in a medium capable of shear and compression, the plane of the surface is generally non-horizontal, and the medial axis represents the shape of the surface as it is deformed lateral to the axis by shearing and axial to the axis by compression.

13. The sensor array of claim 1, wherein a portion of the rigid bodies is non-vertical and another portion is non-horizontal and the lateral component of the path of the medial axis is determined by the combination of three-dimensional tilt data from the non-horizontal rigid bodies, vertical-plane tilt data from the non-vertical rigid bodies, and the wavelengths of the spatial Fourier components of the shape of the path for which data are available.

14. The sensor array of claim 1, wherein at least one joint has an unknown amount of twist, and the twist is re-calculated based on the geometrical constraints of the at least two-dimensional surface, the tilts of the rigid bodies, and the joints for which twist is known.

15. The sensor array of claim 1, wherein the medial axis is determined from at least one spatial frequency component of said path.

16. The sensor array of claim 15, wherein the at least one spatial frequency component is determined by Fourier transformation.

17. The sensor array of claim 1, wherein the sensor path cyclically surrounds a medial axis that is an arc within a generally cylindrical surface, a band surface is defined between two arcs containing the extrema of the sensor path cycles within the generally cylindrical surface, for representing the at least two-dimensional shape of the generally cylindrical surface near the sensor path as it is deformed in at least two dimensions.

* * * * *